United States Patent
Krasnikov

(10) Patent No.: US 9,740,782 B2
(45) Date of Patent: Aug. 22, 2017

(54) METHOD FOR ESTIMATING USER INTERESTS

(71) Applicant: YANDEX EUROPE AG, Lucerne (CH)

(72) Inventor: Andrey Borisovich Krasnikov, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 0 days.

(21) Appl. No.: 15/102,755

(22) PCT Filed: Feb. 2, 2015

(86) PCT No.: PCT/IB2015/050791
§ 371 (c)(1),
(2) Date: Jun. 8, 2016

(87) PCT Pub. No.: WO2016/038471
PCT Pub. Date: Mar. 17, 2016

(65) Prior Publication Data
US 2016/0314478 A1    Oct. 27, 2016

(30) Foreign Application Priority Data

Sep. 12, 2014 (RU) .................................. 2014136907

(51) Int. Cl.
*G06F 17/30* (2006.01)
*H04B 7/06* (2006.01)
(Continued)

(52) U.S. Cl.
CPC ... *G06F 17/30864* (2013.01); *G06Q 30/0201* (2013.01); *G06Q 30/0251* (2013.01);
(Continued)

(58) Field of Classification Search
None
See application file for complete search history.

(56) References Cited

U.S. PATENT DOCUMENTS 6,012,024 A * 1/2000 Hofmann ................ G10L 19/18
704/201
6,134,532 A    10/2000 Lazarus et al.
(Continued)

FOREIGN PATENT DOCUMENTS

KR    1020130085271    7/2013
RU        2516762 C2    11/2009
(Continued)

OTHER PUBLICATIONS

Masci et al., Multimodal similarity-preserving hashing, Apr. 2014, retrieved on May 14, 2015, Retrieved from the Internet: <URL: http://people.idsia.ch/-masci/papers/2012_MasBroBroSch_PAMI.pdf>.
(Continued)

*Primary Examiner* — Gurkanwaljit Singh
(74) *Attorney, Agent, or Firm* — BCF LLP

(57) ABSTRACT

Computer-implemented method for estimating user interests, executable by a computing device in communication with an output device, comprising: determining a first input vector corresponding to a first user event and a second input vector corresponding to a second user event; mapping first input vector to a first output vector and second input vector to a second 5 output vector in a first multidimensional space using a first vector-mapping module; determining a third input vector based on first output vector and second output vector; mapping third input vector to a third output vector in a second multidimensional space using a second vector-mapping module; determining a message to be provided to a user based on an analysis of at least one of first output vector and third output vector; and causing output 10 device
(Continued)

to provide message to user. Also non-transitory computer-readable medium storing program instructions for carrying out the method.

25 Claims, 26 Drawing Sheets

(51) Int. Cl.
  *H04W 72/06* (2009.01)
  *G06Q 30/02* (2012.01)
  *H04L 12/24* (2006.01)
  *G06N 3/04* (2006.01)

(52) U.S. Cl.
  CPC ......... *H04B 7/0617* (2013.01); *H04B 7/0626* (2013.01); *H04W 72/06* (2013.01); *G06N 3/049* (2013.01); *H04L 41/046* (2013.01)

(56) References Cited

U.S. PATENT DOCUMENTS

| | | | |
|---|---|---|---|
| 7,690,013 B1 | 3/2010 | Eldering et al. | |
| 7,809,740 B2* | 10/2010 | Chung | G06Q 30/02 707/758 |
| 8,438,170 B2* | 5/2013 | Koran | G06Q 30/02 707/748 |
| 8,504,570 B2* | 8/2013 | Hawkins | G06N 99/005 707/737 |
| 8,645,291 B2* | 2/2014 | Hawkins | G06N 99/005 706/12 |
| 8,732,219 B1* | 5/2014 | Ferries | G06F 17/30241 707/723 |
| 8,775,341 B1 | 7/2014 | Commons | |
| 8,978,114 B1* | 3/2015 | Kaushik | G06F 21/6218 726/2 |
| 9,159,021 B2* | 10/2015 | Hawkins | G06N 3/049 |
| 9,519,859 B2* | 12/2016 | Huang | G06N 3/0454 |
| 2003/0191608 A1* | 10/2003 | Anderson | G06F 11/328 702/189 |
| 2004/0148140 A1 | 7/2004 | Tarassenko | |
| 2007/0239517 A1* | 10/2007 | Chung | G06Q 30/02 705/14.53 |
| 2007/0239518 A1* | 10/2007 | Chung | G06Q 30/02 707/758 |
| 2007/0239535 A1* | 10/2007 | Koran | G06Q 30/02 705/14.25 |
| 2010/0169157 A1 | 7/2010 | Muhonen et al. | |
| 2011/0072003 A1* | 3/2011 | Boldyrev | G06F 17/30427 707/713 |
| 2011/0282964 A1 | 11/2011 | Krishnaswamy et al. | |
| 2013/0038744 A1* | 2/2013 | Proca | H04N 5/23261 348/208.2 |
| 2013/0141601 A1* | 6/2013 | Proca | H04N 5/23267 348/208.6 |
| 2013/0187951 A1 | 7/2013 | Suzuki | |
| 2013/0238429 A1* | 9/2013 | Koran | G06Q 30/02 705/14.49 |
| 2014/0280214 A1 | 9/2014 | Han et al. | |
| 2015/0237322 A1* | 8/2015 | Stec | H04N 9/77 348/453 |

FOREIGN PATENT DOCUMENTS

| | | |
|---|---|---|
| WO | 2005122717 A2 | 12/2005 |
| WO | 2014043699 A1 | 3/2014 |
| WO | 2014083429 A1 | 6/2014 |

OTHER PUBLICATIONS

International Search Report from PCT/IB2015/050791, Jun. 17, 2015, Blaine R. Copenheaver.
Shi et al., A Compression Framework for Generating User Profiles, Sigir, 2010.
Hadsell et al., Dimensionality Reduction by Learning an Invariant Mapping, The Courant Institute of Mathematical Sciences, New York, Nov. 2005.
Hinton, Learning multiple layers of representation, Trends in Cognitive Sciences, vol. 11 No. 10, 2007, pp. 428-434.
Kim et al., Learning Implicit User Interest Hierarchy for Context in Personalization, Florida Institute of Technology, Florida.
Chopra et al., Learning a Similarity Metric Discriminatively, with Application to Face Verification, Courant Institute of Mathematical Sciences.
Deschryver et al., Chapter VIII New Forms of Deep Learning on the Web: Meeting the Challenge of Cognitive Load in Conditions of Unfettered Exploration in Online Multimedia Environments, pp. 134-152, 2009, IGI Global.
Shmueli-Scheuer et al., IBM Research, Haifa, MDAC'10, Apr. 26, 2010, Raleigh, NC, USA.
English abstract of KR20130085271 retrieved from Espacenet on Apr. 18, 2016.
International Search Report from PCT/I132015/050791, Blaine R. Copenheaver, Jun. 17, 2015.
International Preliminary Report on Patentability from PCT/IB2015/050791, Jeffrey A. Gaffin, Oct. 28, 2015.

* cited by examiner

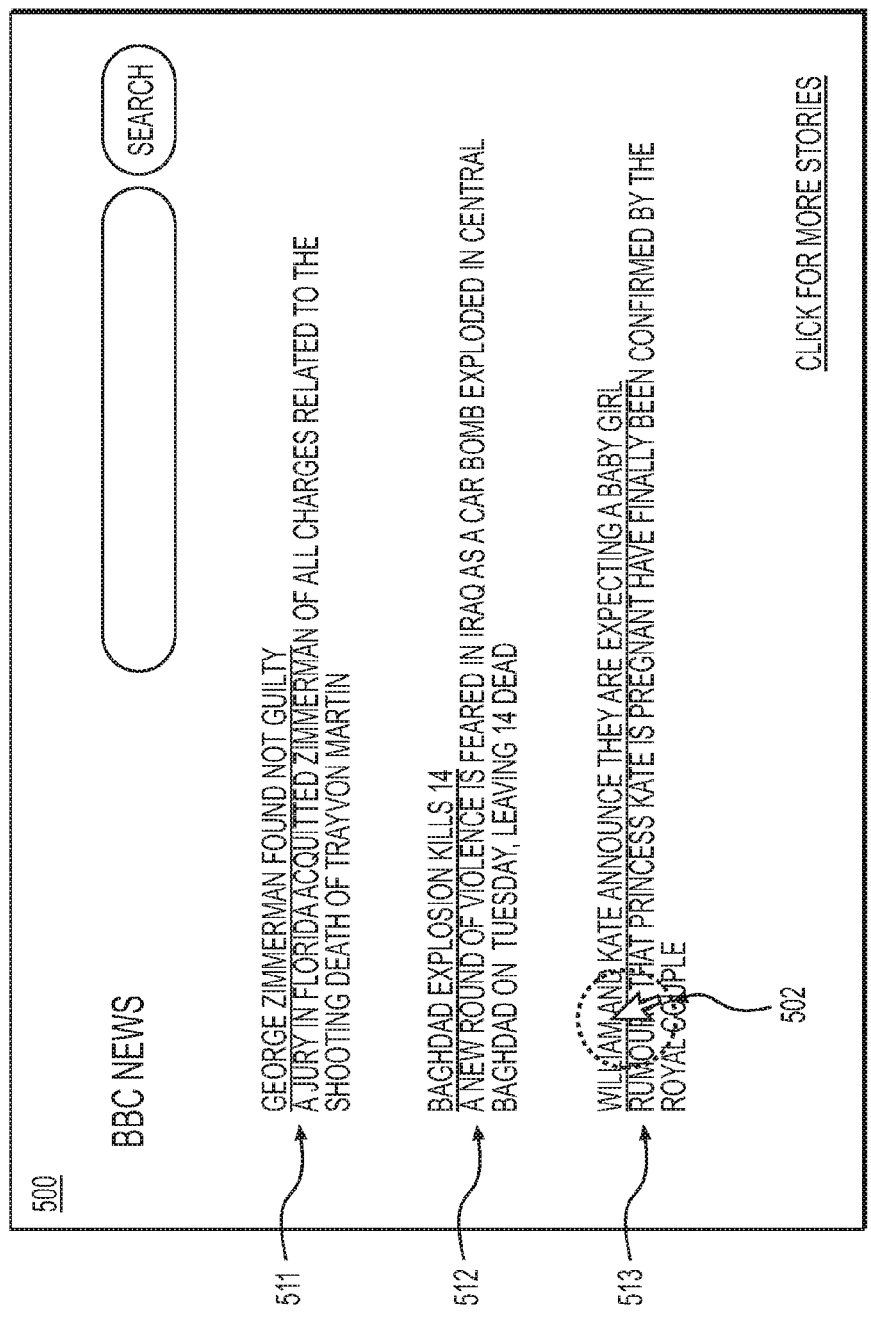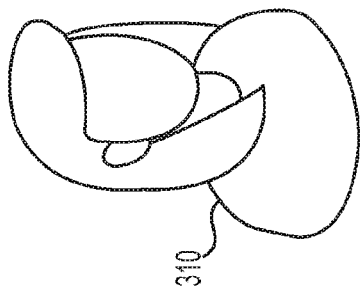
FIG. 20

METHOD FOR ESTIMATING USER INTERESTS

CROSS-REFERENCE

The present application claims priority to Russian Patent Application No. 2014136907, filed Sep. 12, 2014, entitled "METHOD FOR ESTIMATING USER INTERESTS" the entirety of which is incorporated herein.

FIELD

The present technology relates to computer-implemented methods for estimating user interests.

BACKGROUND

Various websites and online services analyze the behavior of users of their services in order to select relevant content to be presented either to those same users or to other users. For example, some search engines keep track of a search history of their users in order to determine which display advertisements may be of interest to them, and some online music services may observe that a first user's listening history resembles a second user's listening history and therefore suggest to the second user a favorite song of the first user to which the second user has not yet listened.

In order to estimate which advertisements, webpages, geographical locations, or other potential user events may be of interest to a user, online services may collect profile information about the user and behavioral information regarding actions performed either by that user or by other users. The behavioral information may include information about one or more event types of user actions, such as selections of buttons or webpage hyperlinks, submissions of search queries to search engines or other online services, and dwell times with respect to various network resources (e.g. how long a webpage is estimated to have been viewed). The information may be stored in a format which facilitates analysis and extrapolation of estimated user interests and/or anticipated user behaviors.

Generally, different types of information are stored in a respective format suitable for representing that type of information. For example, a web-browsing history of a user may be represented as a catalog of uniform resource identifiers (URIs) of various network resources having been visited by the user, each URI perhaps being accompanied by a timestamp indicative of a date and time that the network resource was visited and/or a dwell time indicative of the amount of time the user presumably spent viewing the network resource. A geographical history of a user, on the other hand, may be represented by a series of geographical coordinates associated with the user, such as position data collected by the user's smartphone or "check-ins" reported by the user to one or more online services, such as social networking services.

Because user events of different types are conventionally represented using different information formats, they can be difficult if not impossible to compare and analyze. Moreover, the sheer number of recorded user can render analysis of the user events inefficient if not impossible. There is therefore a need for improved methods for estimating user interests.

SUMMARY

The present technology provides computer-implemented methods for estimating user interests by way of mapping user events to vectors in a plurality of multidimensional spaces, thereby enabling analysis of the vectors representative of the user events to determine a message to be provided to a user.

These methods may be implemented using a computing device for carrying out their steps, the computing device being in communication with an output device suitable for providing an indication to the user of the one or more potential events estimated to be of interest. The computing device may include vector-mapping modules implemented in hardware, in software, or in a combination of hardware and software, each of the vector-mapping modules being suitable for mapping input vectors from one multidimensional space to output vectors in another multidimensional space. The multidimensional spaces may each have any number of dimensions. The multidimensional spaces need not be defined as such: any set of vectors may be deemed to belong to a multidimensional space as long as the vectors each have a same number of dimensions (equal to that of the deemed multidimensional space) and a distance between each one of the vectors and each other one of the vectors may be defined and computed (e.g. the Euclidean distance—the square root of the dot product with itself of the vector difference of the two vectors).

The vector-mapping modules are configured to map input vectors, each corresponding directly or indirectly to one or more user events, to output vectors in a multidimensional space. A first vector-mapping module maps first input vectors determined based on the user events to first output vectors in a first multidimensional space. A second vector-mapping module maps second input vectors determined based on one or more of the first output vectors to second output vectors in a second multidimensional space.

An analysis of vectors in the first multidimensional space and/or the second multidimensional space may subsequently be performed in order to determine a message to be provided to a user. The message may then be provided to the user via the output device. The message can be any type of information deemed to be of interest to the user. Non-limiting examples include advertisements and hyperlinks to network resources on the Internet.

Thus, in one aspect, various implementations of the present technology provide a method for estimating user interests, the method executable by a computing device in communication with an output device, the method comprising:

determining a first input vector corresponding to a first user event and a second input vector corresponding to a second user event;

mapping the first input vector to a first output vector in a first multidimensional space and the second input vector to a second output vector in the first multidimensional space using a first vector-mapping module;

determining a third input vector based at least in part on the first output vector and the second output vector;

mapping the third input vector to a third output vector in a second multidimensional space using a second vector-mapping module;

determining a message to be provided to a user based at least in part on an analysis of at least one of the first output vector and the third output vector; and causing the output device to provide the message to the user.

In some implementations, the vector-mapping modules have been configured to map input vectors to output vectors such that the output vectors are separated by a target distance from one another, the target distance between any two of the output vectors being correlated to a difference between contexts respectively associated with the two corresponding input vectors. In other words, a difference in context between two user events (or aggregates of user events) becomes represented as a distance, in a multidimensional space, between output vectors having been mapped from input vectors corresponding to those user events. Thus, in some implementations:

the first vector-mapping module has been configured to map first configuration input vectors to first configuration output vectors in the first multidimensional space such that a respective distance separating each one of the first configuration output vectors from each other one of the first configuration output vectors is correlated to a difference between a context associated with a respective one of the first configuration input vectors having been mapped to the one of the first configuration output vectors and a context associated with a respective other one of the first configuration input vectors having been mapped to the other one of the first configuration output vectors; and the second vector-mapping module has been configured to map second configuration input vectors to second configuration output vectors in the second multidimensional space such that a respective distance separating each one of the second configuration output vectors from each other one of the second configuration output vectors is correlated to a difference between a context associated with a respective one of the second configuration input vectors having been mapped to the one of the second configuration output vectors and a context associated with a respective other one of the second configuration input vectors having been mapped to the other one of the second configuration output vectors.

As a non-limiting example, each one of the input vectors may be associated with a timestamp representative of the time of the user event(s) to which it corresponds, and the context associated with each one of the configuration input vectors may be determined based on the respective timestamp associated with that configuration input vector. Thus, in some implementations, the difference between the context associated with the respective one of the first configuration input vectors having been mapped to the one of the first configuration output vectors and the context associated with the respective other one of the first configuration input vectors having been mapped to the other one of the first configuration output vectors comprises a time interval between a time associated with the respective one of the first configuration input vectors having been mapped to the one of the first configuration output vectors and a time associated with the respective other one of the first configuration input vectors having been mapped to the other one of the first configuration output vectors; and the difference between the context associated with the respective one of the second configuration input vectors having been mapped to the one of the second configuration output vectors and the context associated with the respective other one of the second configuration input vectors having been mapped to the other one of the second configuration output vectors comprises a time interval between a time associated with the respective one of the second configuration input vectors having been mapped to the one of the second configuration output vectors and a time associated with the respective other one of the second configuration input vectors having been mapped to the other one of the second configuration output vectors.

In some implementations, the output vectors mapped to the second multidimensional space represent one or more user events having occurred during a certain period time, such as a minute, an hour, a day, a month, a year, a decade, and so on. Thus, in some implementations, the third output vector represents a plurality of user events having occurred during a first period of time.

In some implementations, vectors in the second multidimensional space may be further mapped to a third multidimensional space. Thus, in some implementations, the method further comprises:

determining a fourth input vector based at least in part on the third output vector; and mapping the fourth input vector to a fourth output vector in a third multidimensional space using a third vector-mapping module.

Again, as was the case above in respect of the first vector-mapping module and the second vector-mapping module, the third vector-mapping module may have been configured to map configuration input vectors to configuration output vectors based at least in part on contexts respectively associated with the configuration input vectors. Thus, in some implementations, the third vector-mapping module has been configured to map third configuration input vectors to third configuration output vectors in the third multidimensional space such that a respective distance separating each one of the third configuration output vectors from each other one of the third configuration output vectors is correlated to a difference between a context associated with a respective one of the third configuration input vectors having been mapped to the one of the third configuration output vectors and a context associated with a respective other one of the third configuration input vectors having been mapped to the other one of the third configuration output vectors.

In some implementations, the difference between the context associated with the respective one of the third configuration input vectors having been mapped to the one of the third configuration output vectors and the context associated with the respective other one of the third configuration input vectors having been mapped to the other one of the third configuration output vectors comprises a time interval between a time associated with the respective one of the third configuration input vectors having been mapped to the one of the third configuration output vectors and a time associated with the respective other one of the third configuration input vectors having been mapped to the other one of the third configuration output vectors.

In some implementations, the vectors mapped to the second multidimensional space represent one or more user events having occurred during a relatively short period of time (e.g. a three-minute period), and the vectors mapped to the second multidimensional space represent one or more user events having occurred during a relatively long period of time (e.g. a one-hour period). Thus, in some further implementations, the third output vector represents a plurality of user events having occurred during a first period of time; and the fourth output vector represents a plurality of user events having occurred during a second period of time, the second period of time being longer than the first period of time and including the first period of time.

In such implementations, vectors in the first multidimensional space are therefore representative of user events having occurred over a shorter time period and vectors in the second multidimensional space are representative of user events having occurred over a longer time period. As such, the present technology enables subsequent analysis to be performed based on vectors representative of user behaviour at a shorter timescale, at a longer timescale, or at a combination of shorter and longer timescales. For example, some implementations of the present technology may analyze user behaviour at a short timescale in some cases, for example when determining a ranking of search results to be presented to a user based on a recent browsing history associated with the user over the past few minutes, and analyze user behaviour at a longer timescale in other cases, for example when selecting an advertisement to be presented to a user, perhaps based on an estimated demographic profile determined based on that user's browsing history over the past several months or years.

Some implementations of the present technology may aggregate information regarding user events of more than one event type. This may be achieved by representing the user events of all of the event types as vectors in a same multidimensional space. Analysis and comparison of user events of disparate event types is thus facilitated. Thus, in some implementations, the first user event is of a first user event type and the second user event is of a second user event type other than the first user event type.

Some implementations of the vector-mapping modules of the present technology may employ neural networks suitable for mapping input vectors to output vectors. Input nodes of the neural networks may take an input vector as input, and then propagate consequent values through the nodes of the network to output nodes which finally express an output vector corresponding to the input vector. The neural networks may be organized according to any suitable network structure, whether fully or partially connected, with or without any number of intermediate nodes between the input nodes and the output nodes. Thus, in some implementations:

mapping the first input vector to the first output vector in the first multidimensional space using the first vector-mapping module comprises mapping the first input vector to the first output vector using a first neural network configured to map input vectors corresponding to user events of the first user event type to output vectors in the first multidimensional space;

mapping the second input vector to the second output vector in the first multidimensional space using the first vector-mapping module comprises mapping the second input vector to the second output vector using a second neural network configured to map input vectors corresponding to user events of the second user event type to output vectors in the first multidimensional space; and mapping the third input vector to the third output vector in the second multidimensional space using the second vector-mapping module comprises mapping the third input vector to the third output vector in the second multidimensional space using a third neural network having been configured to map input vectors having been determined based on at least one vector in the first multidimensional space to output vectors in the second multidimensional space.

In some implementations, the vector-mapping modules have been preconfigured, and the computing device merely performs the mapping of the input vectors to the output vectors using the preconfigured vector-mapping modules. In other implementations, a configuration having been determined may be applied to an unconfigured vector-mapping module (e.g. by setting values of parameters of a vector-mapping module). In yet other implementations, the configuration of the vector-mapping modules itself is also performed by the computing device. Thus, in some implementations, the method further comprises:

before mapping the first input vector to the first output vector using the first vector-mapping module, configuring the first vector-mapping module to map the first configuration input vectors to the first configuration output vectors in the first multidimensional space such that the respective distance separating each one of the first configuration output vectors from each other one of the first configuration output vectors is correlated to the difference between the context associated with the respective one of the first configuration input vectors having been mapped to the one of the first configuration output vectors and the context associated with the respective other one of the first configuration input vectors having been mapped to the other one of the first configuration output vectors; and before mapping the third input vector to the third output vector using the second vector-mapping module, configuring the second vector-mapping module to map the second configuration input vectors to the second configuration output vectors in the second multidimensional space such that the respective distance separating each one of the second configuration output vectors from each other one of the second configuration output vectors is correlated to the difference between the context associated with the respective one of the second configuration input vectors having been mapped to the one of the second configuration output vectors and the context associated with the respective other one of the second configuration input vectors having been mapped to the other one of the second configuration output vectors.

In implementations wherein the difference in the respective contexts of the configuration input vectors comprises a time interval between respective times of user events corresponding to those configuration input vectors, configuration of the vector-mapping modules is based at least in part on those time intervals. Thus, in some implementations, the method further comprises:

before mapping the first input vector to the first output vector using the first vector-mapping module, configuring the first vector-mapping module to map the first configuration input vectors to the first configuration output vectors in the first multidimensional space such that the respective distance separating each one of the first configuration output vectors from each other one of the first configuration output vectors is correlated to the time interval between the time associated with the respective one of the first configuration input vectors being mapped to the one of the first configuration output vectors and the time associated with the respective other one of the first configuration input vectors being mapped to the other one of the first configuration output vectors; and before mapping the third input vector to the third output vector using the second vector-mapping module, configuring the second vector-mapping module to map the second configuration input vectors to the second configuration output vectors in the second multidimensional space such that the respective distance separating each one of the second configuration output vectors from each other one of the second configuration output vectors is correlated to the time interval between the time associated with the respective one of the second configuration input vectors being mapped to the one of the second configuration output vectors and the time associated with the respective other one of the second configuration input vectors being mapped to the other one of the second configuration output vectors.

In implementations comprising neural networks, configuration of the vector-mapping modules comprises configuration of the neural networks. Thus, in some implementations, configuring the first vector-mapping module comprises configuring a first neural network and a second neural network, and configuring the second vector-mapping module comprises configuring a third neural network. Configuration may take place, for example, by training the neural networks based on a set of training data. The training data may be hypothetical in nature or gathered from actual user events having occurred.

Because user events may be of more than one event type in some implementations, neural networks corresponding to respective event types may be employed. In order to effectively map the input vectors corresponding to disparate event types to a same multidimensional space, the neural networks may be trained while connected in a coupled Siamese neural network configuration, as described in "Multimodal similarity-preserving hashing" by Masci et al. ("Masci" hereinafter), published in Cornell University Library's "arXiv" archive for citation as "arXiv:1207.1522", the entirety of which is hereby incorporated by reference in jurisdictions so allowing. The neural networks each corresponding to a respective user event type may be trained so as to minimize cross-modal loss as described therein. Thus, in some further implementations, configuring the first neural network and the second neural network comprises connecting the first neural network and the second neural network in a coupled Siamese neural network arrangement; and training the first neural network and the second neural network to minimize a cross-modal loss between the first neural network and the second neural network.

There are three different phases associated with implementations of the present technology: (1) configuration of the vector-mapping modules, (2) mapping of input vectors corresponding to user events to output vectors in one or more multidimensional spaces, and (3) determination of a message to be provided to a user. Each of these may be performed in respect of the same user or of one or more different users. For example, the vector-mapping modules may be configured by training one or more of its constituent neural networks using training data comprising information about user events associated with a first user (e.g. search queries submitted by the first user to a first search engine and geo-location information in respect of an electronic device associated with the first user). Using the configured vector-mapping modules, the computing device may then map input vectors corresponding to user events associated either with the first user or a second user to output vectors in the first and second multidimensional spaces. Finally, analysis of vectors including the output vectors may determine a message to be provided either to the first user or to the second user.

Thus, in some implementations, the first user event and the second user event are associated with the user. In other implementations, at least one of the first user event and the second user event is associated with a second user other than the user.

In some implementations, the first configuration input vectors correspond to user events associated with the user. In other implementations, at least one of the first configuration input vectors corresponds to a user event associated with a second user other than the user.

In some implementations, the method further comprises receiving an indication of the first user event from a user input device in communication with the computing device. In some further implementations, the method further comprises receiving an indication of the second user event from the user input device. In other further implementations, the method further comprises receiving an indication of the second user event from a second user input device other than the user input device.

Various types of user events are contemplated. In some implementations, the first user event comprises a use of a network resource (e.g. a webpage, online service, search engine, etc.). In some such implementations, the use of the network resource comprises a displaying of the network resource on an electronic display. In some such implementations, the use of the network resource comprises a selection of a hyperlink to the network resource. In some such implementations, the network resource is an online service, and the use of the network resource comprises at least one of a displaying, a selection, and a purchase of at least one of a good and a service via the online service. In some such implementations, determining the first input vector corresponding to the first user event comprises determining the first input vector based at least in part on a uniform resource identifier of the network resource. In some such implementations, the network resource is a webpage, and determining the first input vector corresponding to the first user event comprises determining the first input vector based at least in part on a property of the webpage. In some such implementations, the property of the webpage is a title of the webpage.

In some implementations, the network resource comprises a search engine and the use of the network resource comprises a submission of a search query. In some such implementations, determining the first input vector corresponding to the first user event comprises determining the first input vector based at least in part on a search term of the search query.

In some implementations, the second user event comprises an association of a user with a geographical location. In some such implementations, the association of the user with the geographical location comprises a presence of the user within a threshold distance of the geographical location. In some such implementations, determining the second input vector corresponding to the second user event comprises determining the second input vector based at least in part on a geographical coordinate of the geographical location.

In some implementations, determining the message to be provided to the user comprises estimating a network resource to be of interest to the user; and causing the output device to provide the message to the user comprises causing the output device to provide an indication of the network resource to the user. In some such implementations, estimating the network resource to be of interest to the user comprises determining a ranking of a set of network resources; and causing the output device to provide the indication of the network resource to the user comprises causing the output device to provide to the user at least one of an indication of a ranked subset of the set of network resources, an indication of a highest ranked member of the set of network resources, and an indication of a lowest ranked member of the set of network resources.

In some implementations, determining the message to be provided to the user based on the analysis of the at least one of first output vector and the third output vector comprises:

feeding the at least one of the first output vector and the third output vector as an input to an interest identification module having been configured to identify user interests based on vectors in at least one of the first multidimensional space and the second multidimensional space; and determining the message to be provided based on an interest of the user identified by the interest identification module.

In some implementations, determining the message to be provided to the user based on the analysis of the at least one of first output vector and the third output vector comprises:

identifying a second user similar to the user based on the analysis;

identifying an interest of the second user; and determining the message to be provided to the user based on the interest of the second user.

In other implementations, determining the message to be provided to the user based on the analysis of the at least one of first output vector and the third output vector comprises:

associating the user with a group of users based on the analysis;

identifying an interest of the group of users; and determining the message to be provided to the user based on the interest of the group of users.

Input vectors to the second vector-mapping module are determined based at least in part on output vectors in the first multidimensional space. The determination of these input vectors may include taking an average of the output vectors, namely by averaging their values in each dimension. Thus, in some implementations, determining the third input vector based at least in part on the first output vector and the second output vector comprises calculating an average of vectors including the first output vector and the second output vector. Other techniques for determining the input vectors based on the output vectors are contemplated, either instead of or in combination with taking the average of the vectors. For example, statistics regarding the user event types of the user events to which the output vectors correspond may be calculated and included in the input vector.

In other aspects, various implementations of the present technology provide a non-transitory computer-readable medium storing program instructions for estimating user interests, the program instructions being executable by one or more processors of one or more computing devices to carry out one or more of the above-recited methods. Thus, various implementations provide a non-transitory computer-readable medium storing program instructions for estimating user interests, the program instructions being executable by a computing device in communication with an output device to effect:

determination of a first input vector corresponding to a first user event and a second input vector corresponding to a second user event;

mapping of the first input vector to a first output vector in a first multidimensional space and the second input vector to a second output vector in the first multidimensional space using a first vector-mapping module;

determination of a third input vector based at least in part on the first output vector and the second output vector;

mapping of the third input vector to a third output vector in a second multidimensional space using a second vector-mapping module;

determination of a message to be provided to a user based at least in part on an analysis of at least one of the first output vector and the third output vector; and causing the output device to provide the message to the user.

In the context of the present specification, unless expressly provided otherwise, a "computing device" is any hardware and/or software appropriate to the relevant task at hand. Thus, some non-limiting examples of electronic devices include computer processors, computer systems (one or more servers, desktops, laptops, netbooks, etc.), smartphones, and tablets, as well as network equipment such as routers, switches, and gateways.

In the context of the present specification, unless expressly provided otherwise, an "output device" is any hardware suitable for providing information to a user, whether in visual, auditory, or other sensory form. Non-limiting examples include screens, head-mounted displays, projectors, and audio interfaces coupled to speakers or earphones.

In the context of the present specification, unless expressly provided otherwise, an "input device" is any hardware suitable for obtaining information from a user, whether originating in visual, auditory, tactile, or any other sensory form. Non-limiting examples include keyboards, mice, microphones, touchscreens, touchpads, cameras, and antennas.

In the context of the present specification, unless expressly provided otherwise, a first device should be understood to be "in communication with" a second device if each of the devices is capable of sending information to and receiving information from the other device, across any physical medium or combinations of physical media, at any distance, and at any speed. As a non-limiting example, two digital electronic device(s) may communicate over a computer network such as the Internet. As another non-limiting example, the devices may run on the same digital electronic hardware, in which case communication may occur by any means available on such digital electronic hardware, such as inter-process communication.

In the context of the present specification, unless expressly provided otherwise, the expression "computer-readable medium" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, a "search query" is information that a search engine takes into account in respect of a search to be carried out in order to provide the user with the information that the user is seeking to obtain through the search. Each piece of information is an "element" of the search query. Search queries may include a variety of elements, including, but not limited to, one or more "search terms" (e.g. words, letters, numbers, characters, etc.), the IP address of the client device, the geographic location of the client device, the (presumed) language of the search term(s), a search account associated with the (presumed) user of the client device, and the application that the user is using on the client device in respect of the search. Although the user may or may not be aware of the various elements included within their search query, the inclusion of various elements helps to provide the user with the information that they are seeking to obtain through the search. In the present context no particular number or type of elements is generally required, although typically, the more elements provided to the search engine, the better the search results.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular filesystem, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, event type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, "configuration input vectors" and "configuration output vectors" refer to input vectors and output vectors being used to configure a vector-mapping module during a configuration phase.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 20 is an exemplary screenshot of a selection by a user of one of three hyperlinks to news stories being displayed via a web browser;

Figure 1:
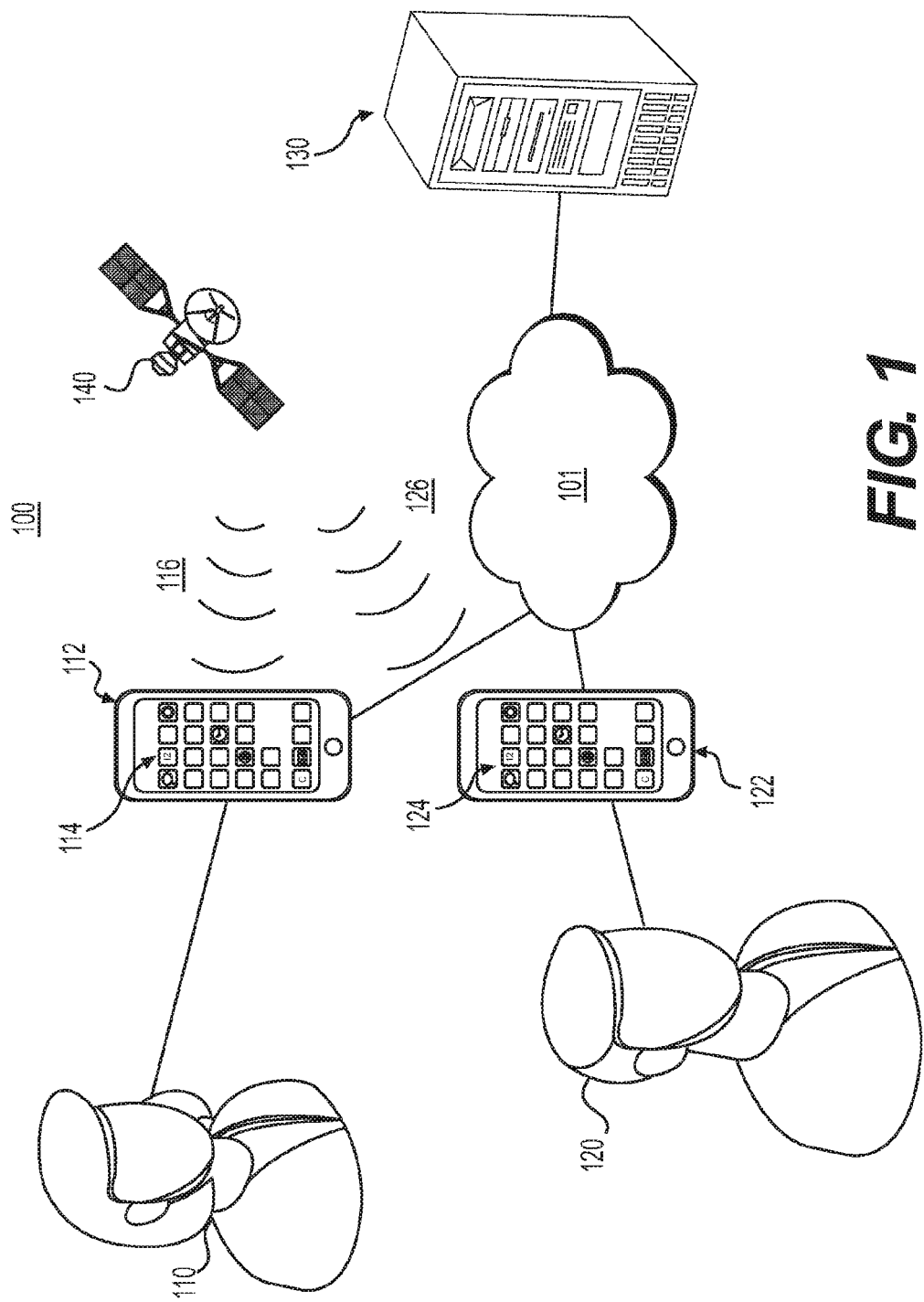
FIG. 1 is a diagram of a networked computing environment suitable for configuring an exemplary implementation of the present technology.

It should also be noted that, unless otherwise explicitly specified, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

There are two phases related to the present technology illustrated in the following figures. FIGS. 1 to 14 refer to a configuration phase wherein various vector-mapping modules of an exemplary implementation of the present technology are configured to map configuration input vectors corresponding to user events to configuration output vectors in various multidimensional spaces, such that a distance separating the output vectors from one another is correlated to a time interval between the input vectors to which they correspond. FIGS. 15 to 26 then refer to an application phase, wherein the configured vector-mapping modules of the exemplary implementation of the present technology are used to determine content of a web page, as just one example of potential applications of the present technology.

Beginning with FIG. 1, there is shown a networked computing environment 100 suitable for configuration of some implementations of the present technology, the networked computing environment 100 comprising a smartphone 112 (e.g. an Apple iPhone™ or a Samsung Galaxy S4™) with a touchscreen 114 for displaying information to a user 110 and receiving touchscreen commands from the user 110, a smartphone 122 with a touchscreen 124 for displaying information to a user 120 and receiving touchscreen commands from the user 120, a server 130 in communication with the smartphones 112 and 122 via a communications network 101 (e.g. the Internet), and a GPS satellite 140 transmitting GPS signals 116 and 126 to smartphone 112 and 122, respectively.

Though not depicted, it will be clear to those of skill in the art that smartphones 112 and 122 each comprise various hardware modules, including, along with their respective touchscreens 114 and 124, one or more single or multi-core processors, a random access memory, one or more network interfaces for communicating with the server 130 via the communications network 101, and a GPS receiver. It will also be understood that other implementations of the present technology may employ a geographical positioning technology other than GPS. Smartphones 112 and 122 are each running an operating system (e.g. Apple iOS, Google Android) which includes an intelligent personal assistant service (e.g. Apple Siri, Google Now).

While server 130 is depicted as a single physical computer (which by implication comprises hardware modules including one or more processors, memory, and a network interface), it will also be understood that server 130 may be implemented using a plurality of networked computers, or as one or more virtual servers running on one or more physical computers (e.g. in the cloud).

Figure 2:
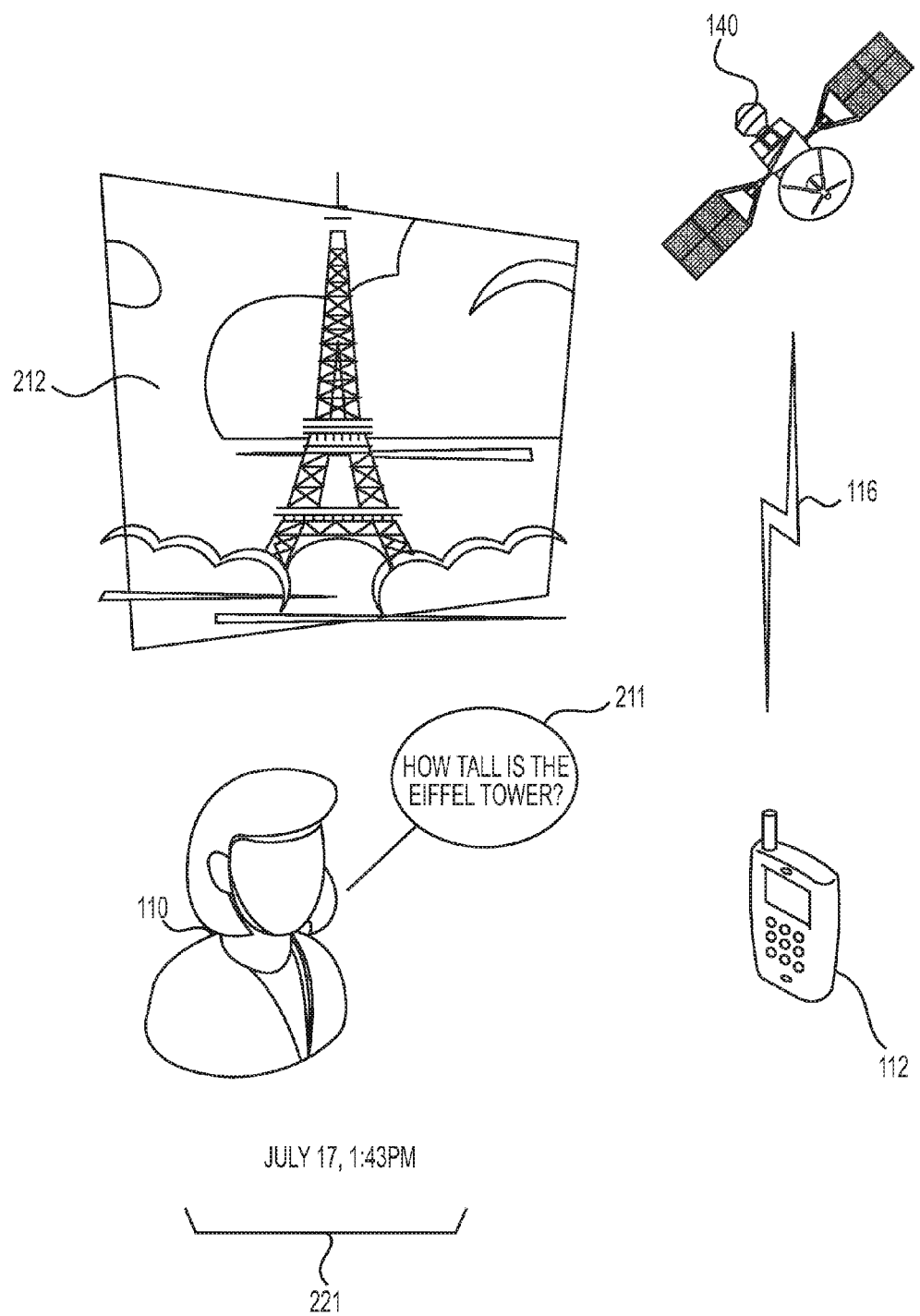
FIGS. 2 to 4 are diagrams representing various user events used for configuring an exemplary implementation of the present technology.

FIG. 2 depicts two user events associated with user 110. The first user event 211 comprises the user 110 asking the question "How tall is the Eiffel Tower?" at a first time 221 (July 17 at 1:43 pm) to the intelligent personal assistant service running on her smartphone 112. The second user event 212 comprises the user 110 being located near the Eiffel Tower according to the GPS signal 116 of GPS satellite 140, at a second time 222 (not depicted in FIG. 2) shortly after the first time 221.

Figure 3:
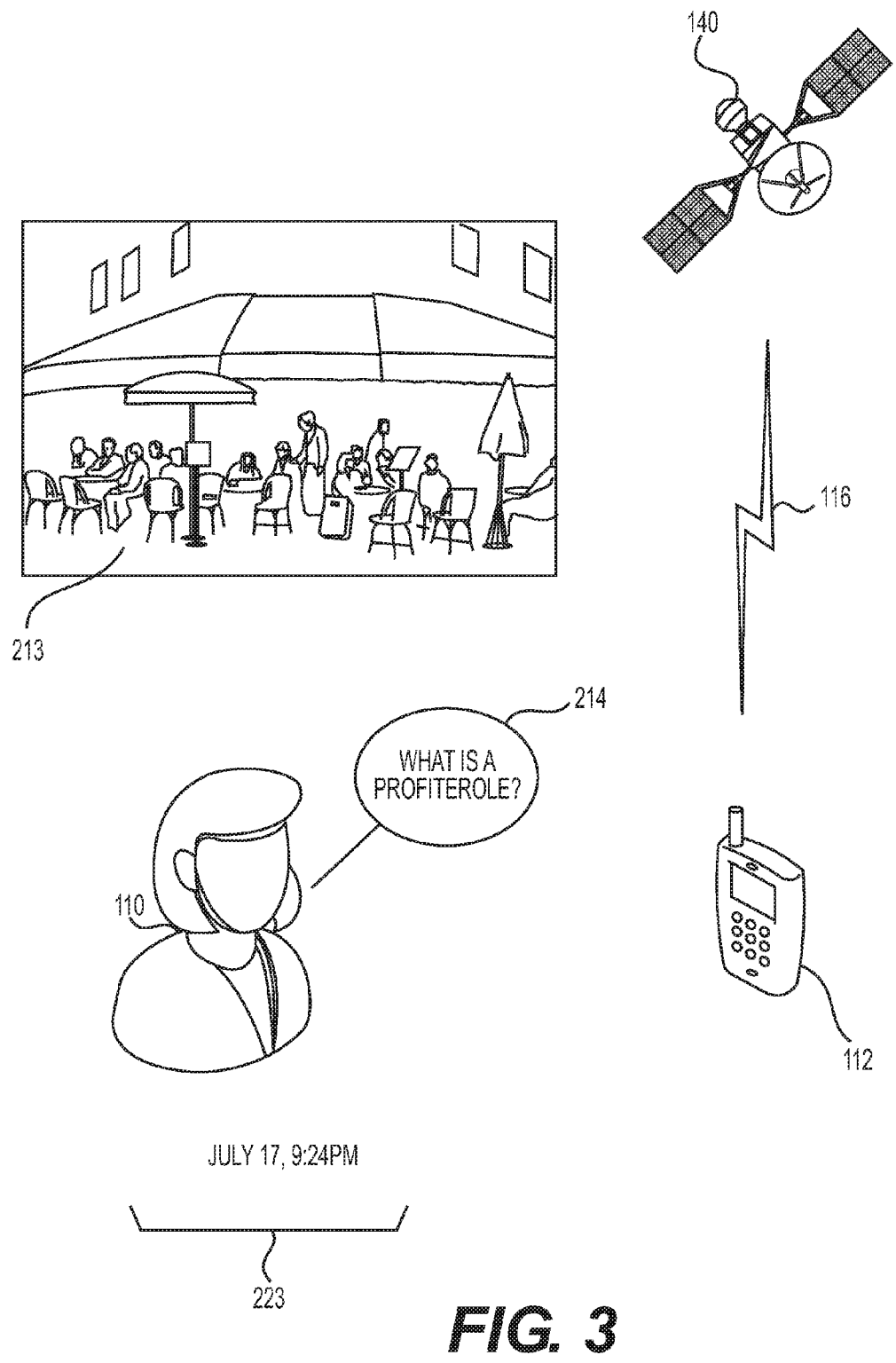

FIG. 3 depicts two further user events associated with user 110, namely a third user event 213 and a fourth user event 214. The third user event 213 comprises the user 110 being located near the famous Parisian cafe "Les Deux Magots" according to the GPS signal 116 of GPS satellite 140 at a third time 223 (July 17, 9:24 pm). The fourth user event 214 comprises the user 110 asking the question "What is a profiterole?" to the intelligent personal assistant service running on her smartphone 112 at a fourth time 224 (not depicted in FIG. 3) shortly after the third time 223.

Figure 4:
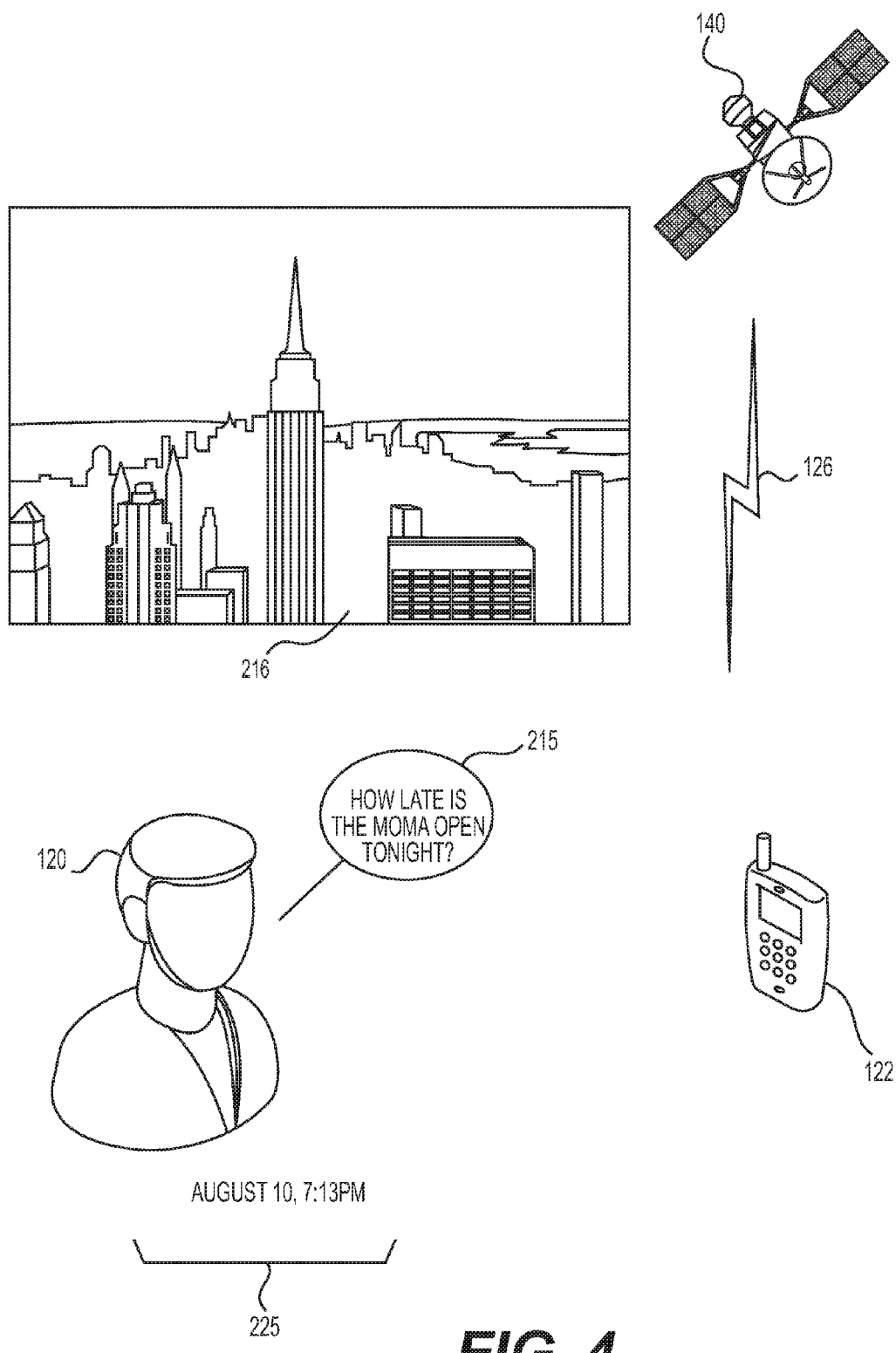

FIG. 4 depicts two further user events, this time associated with another user 120, namely a fifth user event 215 and a sixth user event 216. The fifth user event 215 comprises the user 120 asking the question "How late is the MoMA open tonight?" to the intelligent personal assistant service running on her smartphone 122 at a fifth time 225 (August 10, 7:13 pm). The sixth user event 216 comprises the user 120 being located in New York according to the GPS signal 126 of GPS satellite 140 at a sixth time 226 (not depicted in FIG. 4) shortly after the fifth time 225. It will be noted that, while the user events 215 and 216 are associated with user 120 in the exemplary implementation described herein, in another implementation the user events 211 to 216 based on which the vector-mapping modules are configured could all be associated with the same user 110, or with one or more other users (not depicted).

Figure 5:
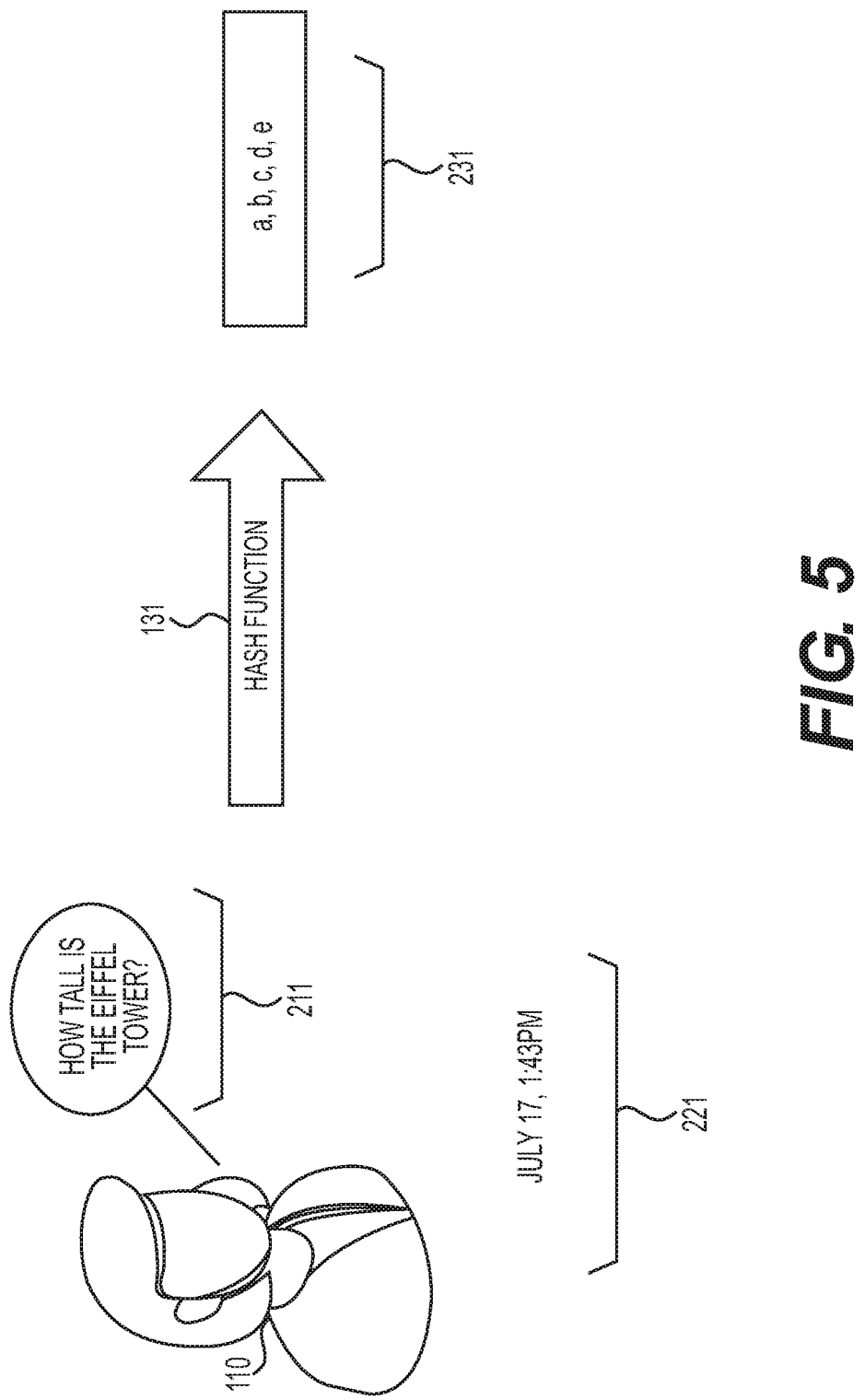
FIGS. 5 and 6 are diagrams representing determination of first configuration input vectors corresponding to user events associated with a user.

FIG. 5 conceptually depicts the determination by the server 130 (of FIG. 1) of a first input vector 231 corresponding to the first user event 211 having occurred at a first time 221 (July 17, 1:43 pm). A first hash function 131 executed by the server 130 is used to generate the first input vector 231 based on the first user event 211, the resulting first input vector 231 consisting of a tuple of hash values in five dimensions (denoted 'a' through 'e'). While the first hash function 131 generates five-dimensional input vectors in the implementation shown, in other implementations the number of dimensions may be greater or lesser.

The first hash function 131 may be specialized to generate input vectors corresponding to user events of a particular user event type, such as the intelligent personal assistant query "How tall is the Eiffel Tower?" of first user event 211, as shown, or it may be a hash function of general nature which can be employed to generate hash values in respect of user events of more than on user event type. Generation of hash values based on arbitrary-length data such as intelligent personal assistant queries is well-known in the art, and any suitable implementation of the first hash function 131 may be employed in concert with the present technology. Once the first input vector 231 has been determined, it may be associated with the first time 221 of the first user event 211, for reasons which will soon become clear.

Figure 6:
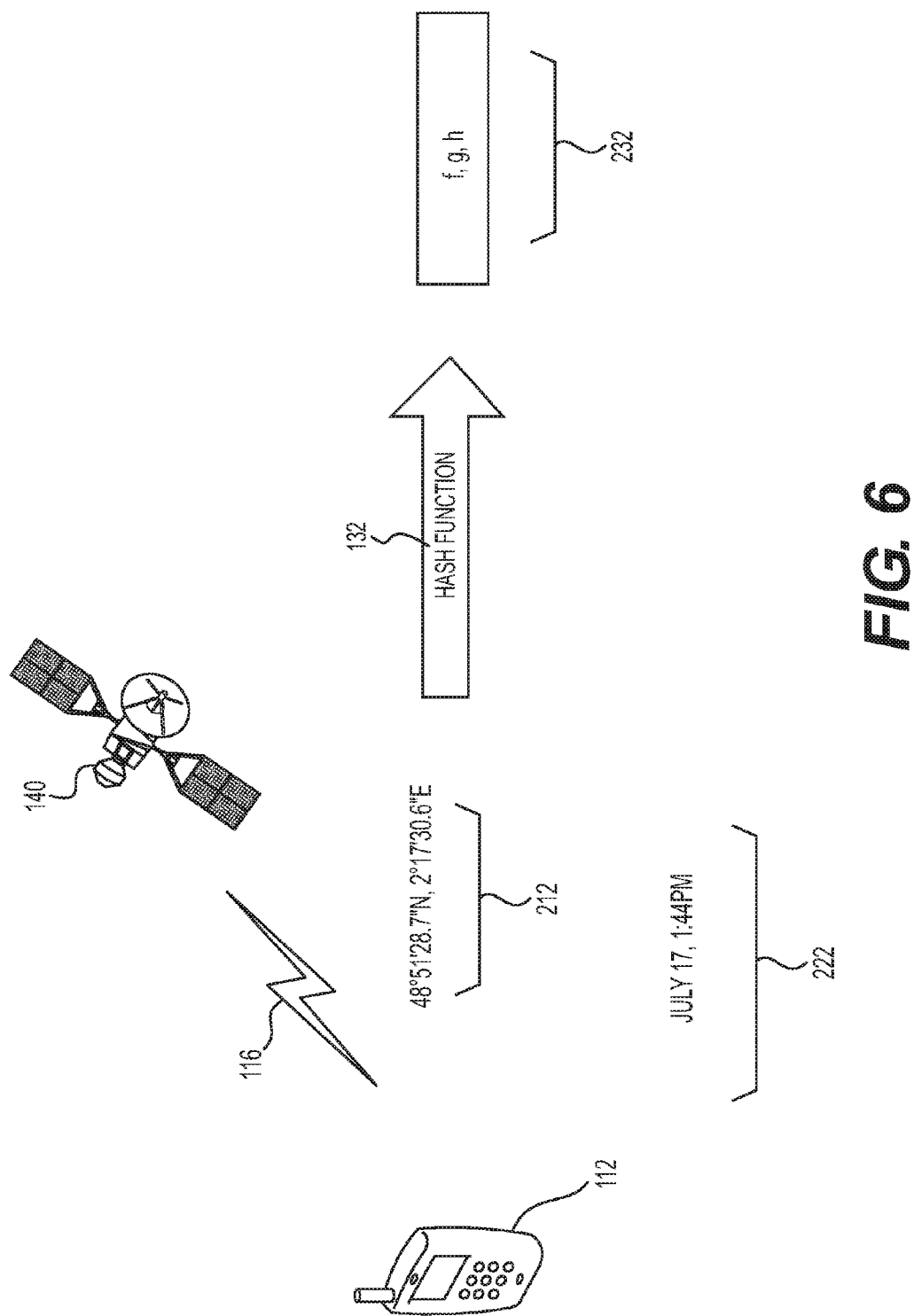

FIG. 6 conceptually depicts the determination by the server 130 of a second input vector 232 corresponding to the second user event 212 having occurred at a second time 222 (July 17, 1:44 pm) shortly after the first time 221. A second hash function 132 executed by the server 130 is used to generated the second input vector 232 based on the second user event 212, the resulting second input vector 232 consisting of a tuple of hash values in three dimensions (denoted 'f' through 'h').

Once again, the number of dimensions may be greater or lesser in other implementations. Also, as above, the second hash function 132 may be used to generate input vectors corresponding to user events of a particular user event type—in this case, the geographical coordinates (e.g. latitude, longitude) of a geographical location (e.g. 48°51'28.7"N, 2°17'30.6"E) associated with the second user event 212. Once the second input vector 232 has been determined, it may be associated with the second time 222 of the second user event 212.

Figure 7:
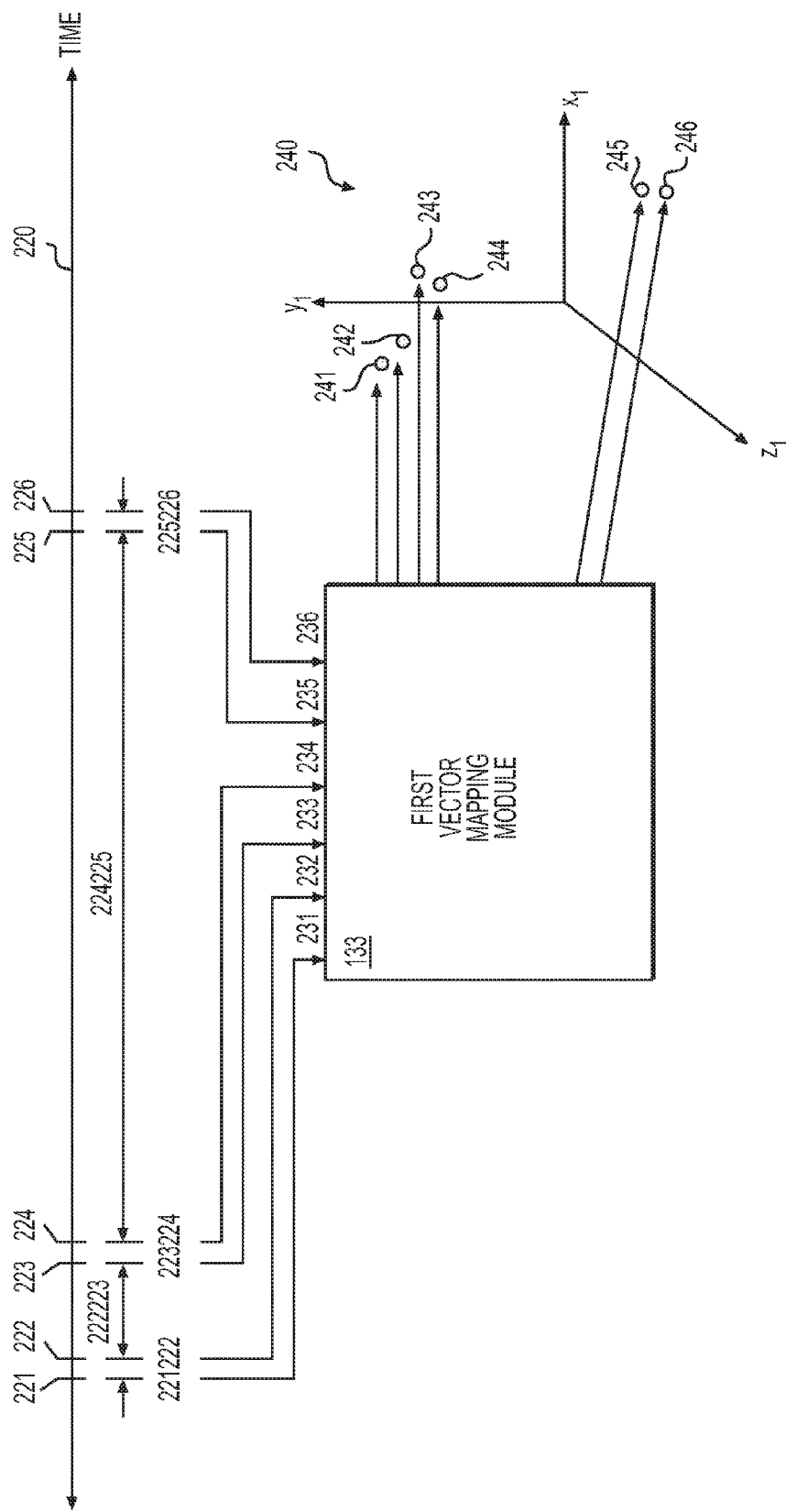
FIG. 7 is a diagram representing mapping of first configuration input vectors to first configuration output vectors in a first multidimensional space using a first vector-mapping module being configured.

FIG. 7 depicts the conceptual process of mapping input vectors 231 to 236, which correspond to the user events 211 to 216 (shown at their respective times 221 to 226 along a timeline 220), to respective output vectors 241 to 246 in a first multidimensional space 240. In the exemplary implementation presented herein, the first multidimensional space 240 has three dimensions ('$x_1$', '$y_1$', and '$z_1$'), but the first multidimensional space 240 could have a greater or lesser number of dimensions in other implementations. The mapping is performed by a first vector-mapping module 133 of the server 130, which may comprise one or more neural networks, such as the first neural network 133A and the second neural network 133B shown in FIG. 8.

Figure 8:
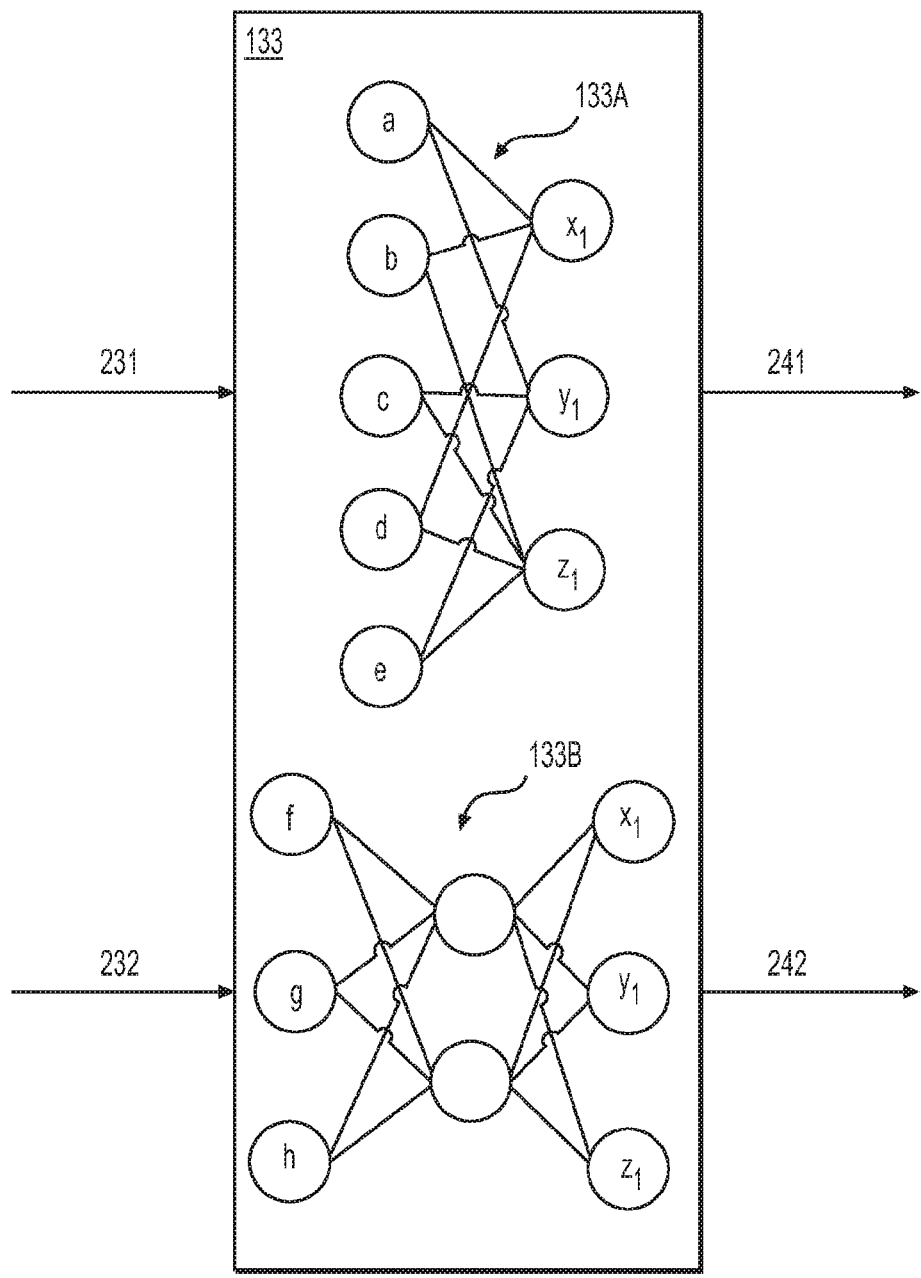
FIG. 8 is a block diagram of a first vector-mapping module comprising two neural networks being configured.

The neural networks 133A and 133B may each be configured to map input vectors corresponding to user events of a particular user event type. For example, as shown in FIG. 8, the first neural network 133A may map input vectors corresponding to intelligent personal assistant queries, such as input vector 231, while the second neural network 133B may map input vectors corresponding to geolocation events, such as input vector 232. In this way, output vectors (e.g. 241 and 242) corresponding to user events of disparate user event types may be mapped to a same multidimensional space (e.g. the first multidimensional space 240), thereby facilitating comparison and analysis of user events of those disparate user event types.

The neural networks 133A and 133B each comprise an input layer with a number of input nodes equal to the dimensionality of the input vectors they are configured to map, and an output layer with a number of nodes equal to the dimensionality of the first multidimensional space 240. In addition, each of the neural networks 133A and 133B may further include one or more hidden layers of any dimensionality, such as the single hidden layer of two nodes (unlabelled) of the second neural network 133B shown in FIG. 8. Moreover, any suitable neural network topology may be employed, whether partially-connected as in the case of the first neural network 133A or fully-connected in the case of the second neural network 133B.

In the configuration phase of the present technology, the first vector-mapping module 133 is to be configured such that the output vectors 241 to 246—to which the input vectors 231 to 236 are mapped—are separated from one another by a distance correlated to a difference between contexts respectively associated with the user events 211 to 216. In other words, user events associated with similar contexts should result in output vectors close together in the first multidimensional space 240, and user events associated with dissimilar contexts should result in output vectors distant from each other in the first multidimensional space 240. In various implementations of the present technology, the "context" with which each of the user events is associated may be determined based on a variety of factors, and the present technology is not limited to any one such factor. For the sake of illustration, the exemplary implementation described herein uses the time of each one of the user events as a proxy for the context of that user event, such that user events having occurred close together in time are deemed to belong to similar contexts, and user events having occurred far apart in time are deemed to belong to dissimilar contexts.

Figure 9:
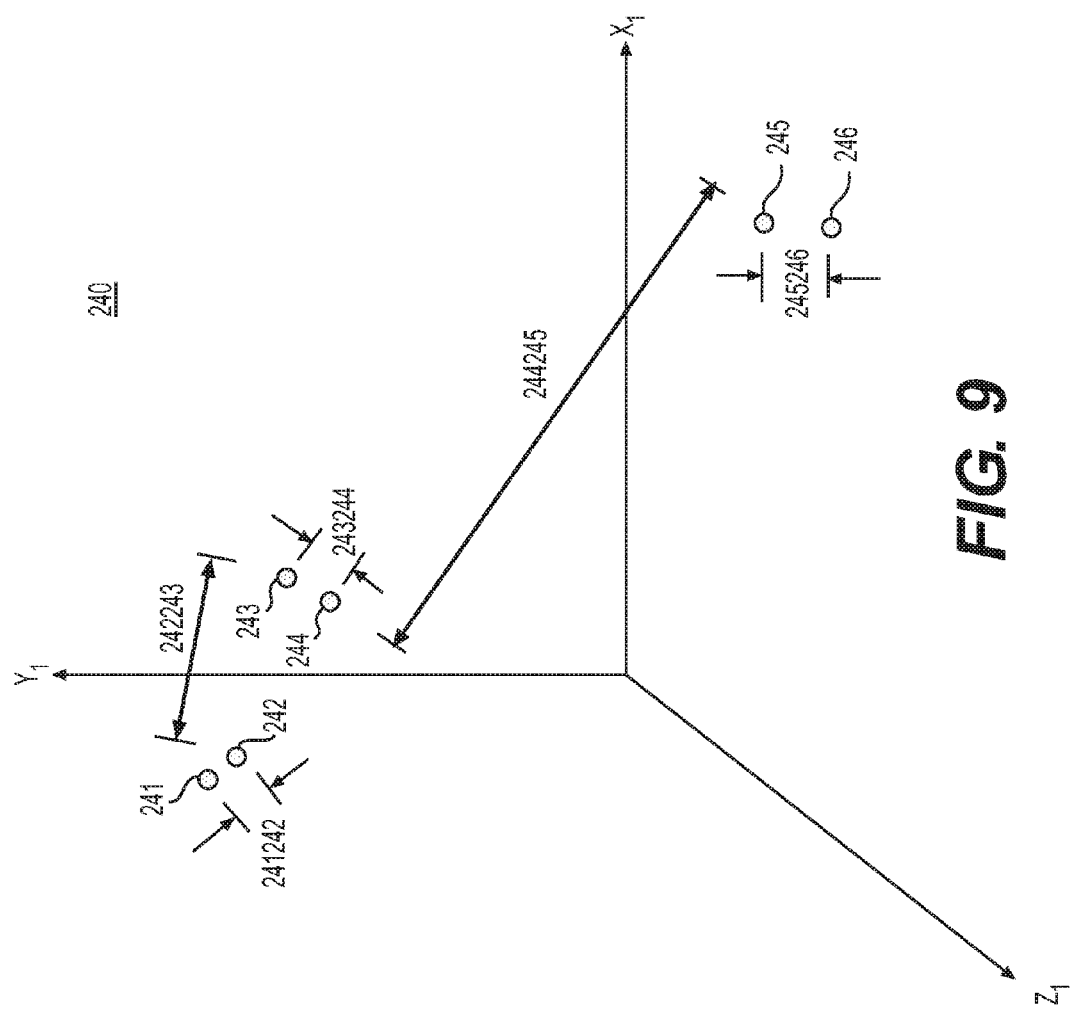
FIG. 9 is a diagram of a first multidimensional space including first configuration output vectors.

For example, as shown in FIG. 9, the first output vector 241 and the second output vector 242 are separated by a short distance 241242 in the first multidimensional space 240, owing to the fact that the time interval 221222 (shown in FIG. 7) between the first time 221 and the second time 222 is also short. The same is true with regard to the distance 243244, which is correlated to the time interval 223224, and the distance 245246, which is correlated to the time interval 225226. Conversely, output vectors 244 and 245 are separated by a relatively large distance 244245, owing to the long time interval 224245 between the fourth time 224 of the fourth user event 214 and the fifth time 225 of the fifth user event 225 (as shown in FIG. 7).

The manner in which the first vector-mapping module 133 is configured to cause input vectors corresponding to user events distant from one another in time to be mapped to output vectors distant from one another in the first multidimensional space 240 is implementation dependent. In implementations of the first vector-mapping module 133 which comprise neural networks (e.g. neural networks 133A and 133B as shown in FIG. 8), configuration of the first vector-mapping module 133 comprises training/adjusting threshold values of the nodes of the neural networks 133A and 133B so as to achieve the desired correlation of distances between the output vectors 241 to 246 to the time intervals between the user events 211 to 216.

Furthermore, in implementations of the first vector-mapping module 133 which include more than one neural network (e.g. 133A and 133B) so as to enable input vectors corresponding to user events of different types to be mapped to a same multidimensional space (e.g. the first multidimensional space 240, as described above with reference to FIG. 7), configuration of the multiple networks (133A, 133B, etc.) may comprise calibration of those neural networks with respect to one another. For example, this may be achieved by training the neural networks (133A, 133B, etc.) while they are connected in a coupled Siamese neural network arrangement, as described in Masci, and adjusting the respective parameters of the neural networks (133A, 133B, etc.) so as to minimize the cross-modal loss between them, wherein the "user event types" of the present technology may be equated to the "modalities" of Masci, with each constituent neural network (133A, 133B, etc.) of the first vector-mapping module 130 being configured to map input vectors corresponding to user events of one user event type to output vectors in the same multidimensional space (the first multidimensional space 240).

Figure 10:
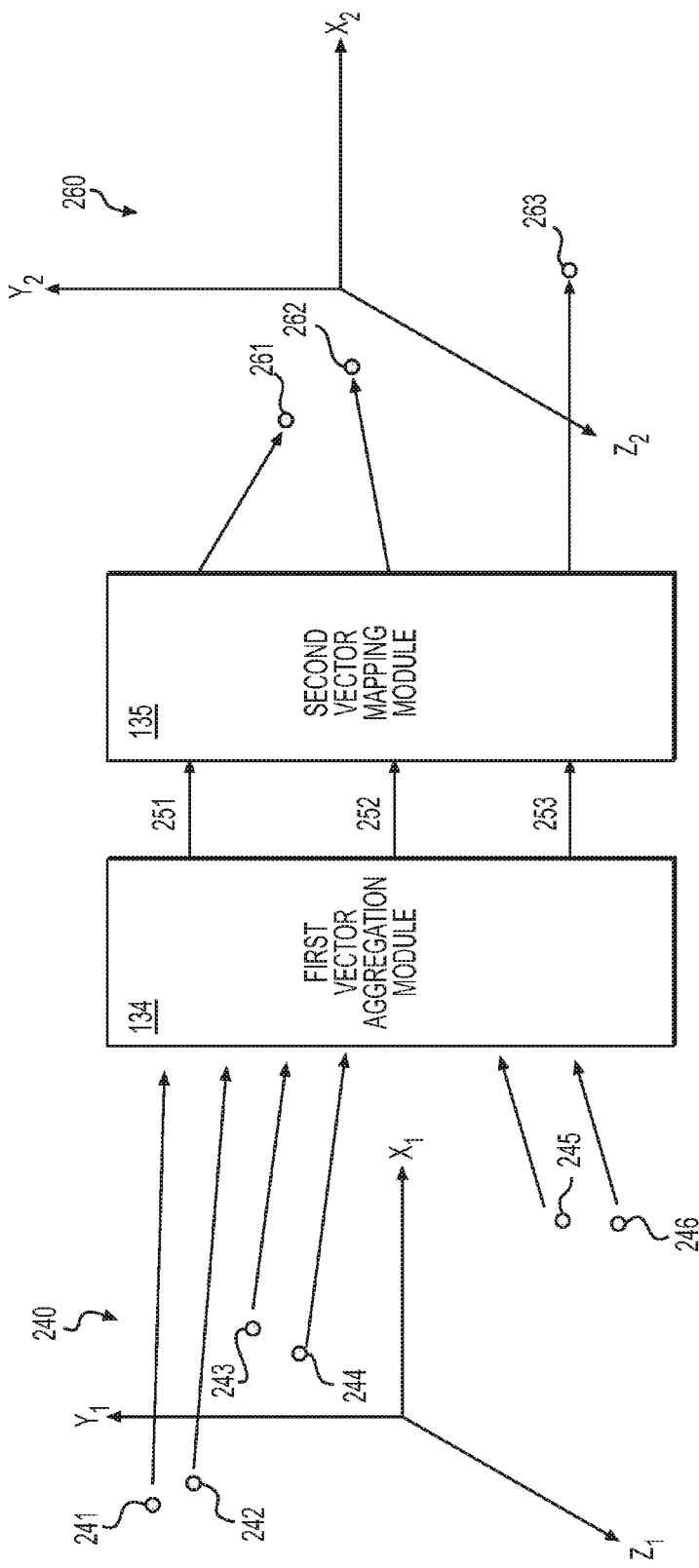
FIG. 10 is a diagram representing determination of second configuration input vectors based on first configuration output vectors and mapping of second configuration input vectors to second configuration output vectors in a second multidimensional space using a second vector-mapping module being configured.

As depicted in FIG. 10, once the first output vectors 241 to 246 have been mapped to the first multidimensional space 240, second input vectors 251 to 253 may be determined based on those first output vectors 241 to 246, for example using a first vector-aggregation module 134 of server 130. As the name implies, the first vector-aggregation module 134 aggregates one or more vectors selected from among the first output vectors 241 to 246 in the first multidimensional space 240, and generates second input vectors based thereon.

For example, in some implementations, the first vector-aggregation module 134 may select a subset of the first output vectors 241 to 246 having resulted from user events 211 to 216 which occurred within a particular period of time (i.e. by checking a timestamp associated to see whether it lies within a particular range of values). Depending on the implementation, the period of time chosen could be of any duration (e.g. one minute, ten minutes, one hour, one day, three weeks, two years, etc.).

In FIG. 10, the input vector 251 corresponds to user events 211 and 212 having both occurred during the same one-hour period (i.e. on July 17 between 1:00 pm and 2:00 pm), the input vector 252 corresponds to user events 213 and 214 having both occurred during another one-hour period (i.e. on July 17 between 9:00 pm and 10:00 pm), and the input vector 253 corresponds to user events 215 and 216 having occurred during another one-hour period (i.e. on August 10 between 7:00 pm and 8:00 pm). Of course, for the sake of comparison across time zones, the time periods in questions may be normalized to a universal time such as Greenwich Mean Time (GMT). Moreover, it will be understood that even though there are only six first output vectors 241 to 246 in the exemplary implementation shown in FIG. 10, a far greater number of user events and corresponding first output vectors may be aggregated in other contexts.

Aggregation of vectors selected by the first vector-aggregation module 134 may comprise concatenating the vectors (i.e. combining them together in parallel, such that the dimensionality of the aggregate vector is equal to the dimensionality of the vectors aggregated multiplied by the number of vectors aggregated). Alternatively, or in combination with concatenation, the aggregation of the vectors may comprise averaging the vectors (i.e. taking the average of the selected vectors in each dimension of the first multidimensional space 240). Aggregation may also comprise compiling statistics about the selected output vectors, such as a count of the number of output vectors having resulted from user events of each user event type. As a result, for example if averaging is employed, the second input vectors 251 to 253 generated by the first vector-aggregation 251 may have one dimension for each dimension of the first multidimensional space 240, plus one additional dimension for each type of user event based on which the first output vectors 241 to 246 were generated.

For example, input vector 251 would have five dimensions: a first dimension corresponding to the "x1" dimension of the first multidimensional space 240 and having a value equal to the average of the values of the first output vectors 241 and 242 in the "x1" dimension, a second dimension corresponding to the "y1" dimension of the first multidimensional space 240 and having a value equal to the average of the values of the first output vectors 241 and 242 in the "y1" dimension, a third dimension corresponding to the "z1" dimension of the first multidimensional space 240 and having a value equal to the average of the values of the first output vectors 241 and 242 in the "z1" dimension, a fourth dimension corresponding to the intelligent personal assistant query user event type and having a value of "1" (the number of first output vectors 241 and 242 having resulted from a user event of that type), and a fifth and final dimension corresponding to the geolocation user event type and also having a value of "1" (the number of first output vectors 241 and 242 having resulted from a user event of that type).

Once the first output vectors 241 to 246 have been aggregated into second input vectors 251 to 253 by the first vector-aggregation module 134, they are mapped to respective second output vectors 261 to 263 in a second multidimensional space 260 using a second vector-mapping module 135 of the server 130. In the exemplary implementation presented herein, the second multidimensional space 260 has three dimensions ('$x_2$', '$y_2$', and '$z_2$'), but the second multidimensional space 260 could have a greater or lesser number of dimensions in other implementations.

Figure 11:
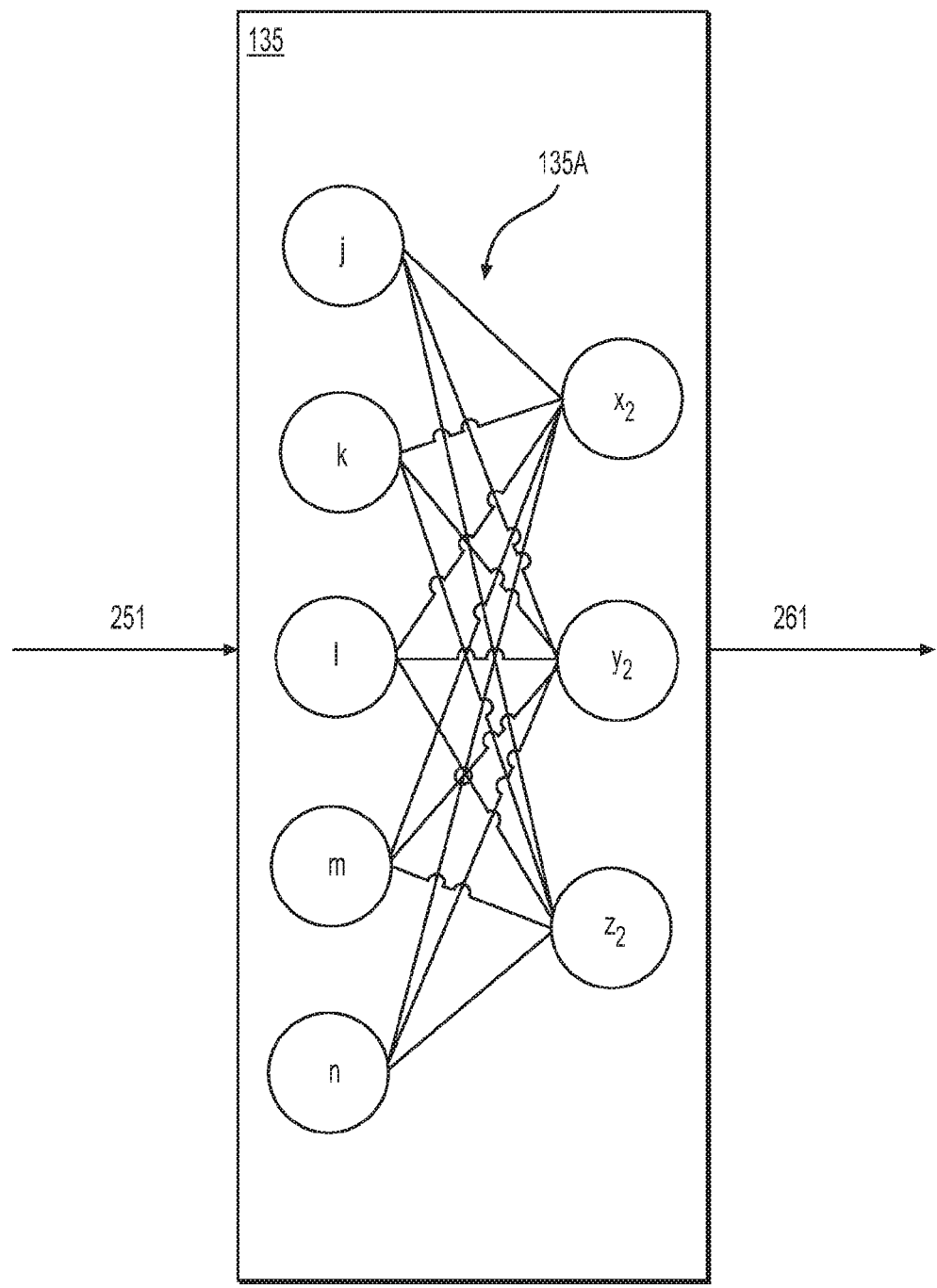
FIG. 11 is a block diagram of a second vector-mapping module comprising a neural network being configured.

Mapping of the second input vectors 251 to 253 to the second output vectors 261 to 263 may be performed by the second vector-mapping module 135 in a similar way as the mapping of the first input vectors 231 to 236 to the first output vectors 241 to 246 performed by the first vector-mapping module 133. As depicted in FIG. 11, the second vector-mapping module 135 may comprise a third neural network 135A, with a number of input nodes equal to the dimensionality of the second input vectors 251 to 253 generated by the first vector-aggregation module 134 and a number of output nodes equal to the dimensionality of the second multidimensional space 260. As was the case with the first neural network 133A and second neural network 133B of the first vector-mapping component 133, the third neural network 135A of the second vector-mapping component 135 may comprise any number of hidden layers of nodes (no hidden layer is included in the implementation depicted in FIG. 11) and the third neural network 135A may be arranged in any suitable network topology, such as the fully-connected topology depicted in FIG. 11.

Figure 12:
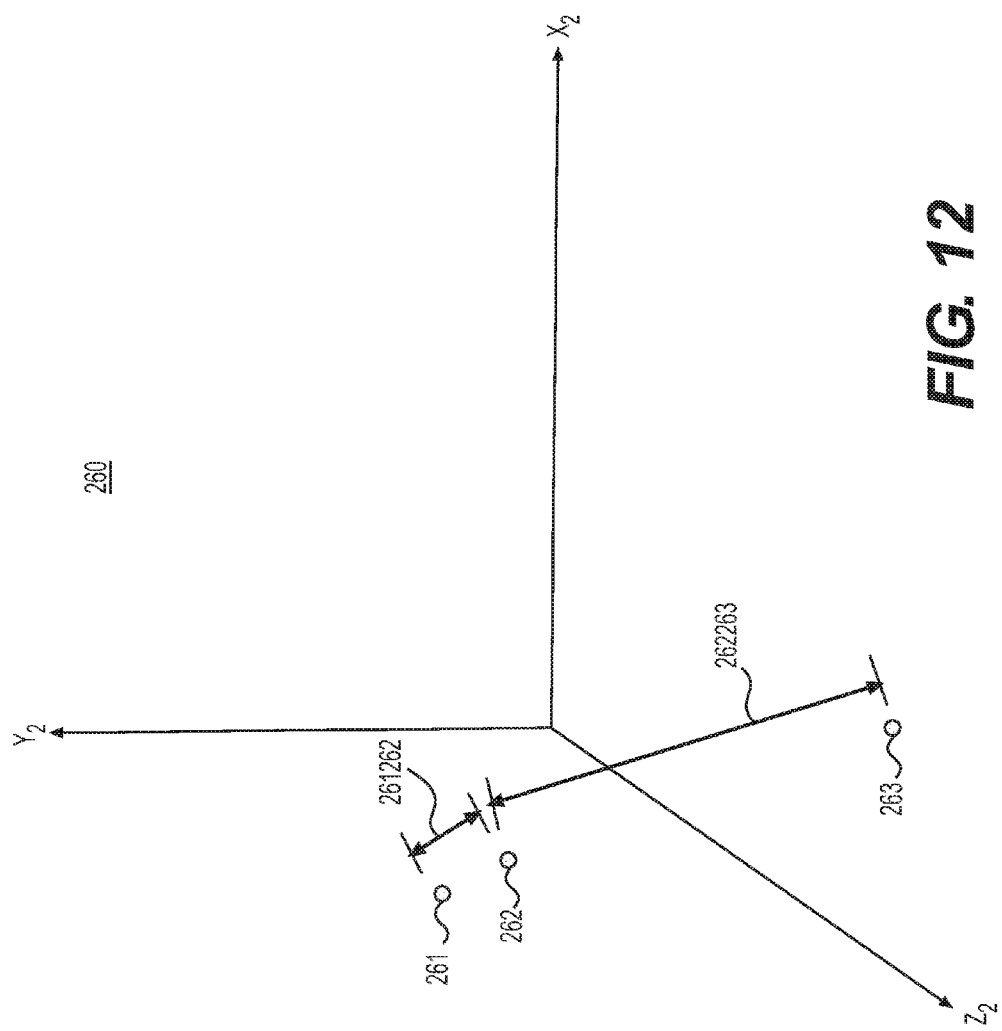
FIG. 12 is a diagram of a second multidimensional space including second configuration output vectors.

FIG. 12 shows the second multidimensional space in greater detail. In particular, the reader's attention is drawn to the distances between the second output vectors 261 to 263. During this configuration phase, the second vector-mapping module 135 is configured such that the second output vectors 261 to 263 are separated from one another by a distance correlated to the length of a time interval between times associated with the corresponding second input vectors 251 to 253 mapped thereto.

For example, as described above, the input vector 251 may correspond to the one-hour period of 1:00 pm to 2:00 pm on July 17, the input vector 252 may correspond to the one-hour period of 9:00 pm and 10:00 pm on July 17, and the input vector 253 may correspond to the one-hour period of 7:00 pm and 8:00 pm on August 10. As such, eight hours separate the time associated with the input vector 251 and the time associated with the input vector 252, and 574 hours separate the time associated with the input vector 252 and the time associated with the input vector 253. As such, the second vector-mapping module would be configured such that the ratio of the distance 262263 (which separates the second output vector 263 from the second output vector 262) to the distance 261262 (which separates the second output vector 262 from the second output vector 261) is approximately 574/8=71.75.

The exact ratio need not be achieved for the present technology to be effective. In implementations wherein the second vector-mapping module 135 is implemented using a third neural network 135A as depicted in FIG. 11, configuration of the second vector-mapping module 135 comprises training/adjusting the threshold values of the nodes of the third neural network 135A such that the distances separating the second output vectors 261 to 263 from one another are correlated to the time intervals between the times associated with the corresponding second input vectors 251 to 253.

Figure 13:
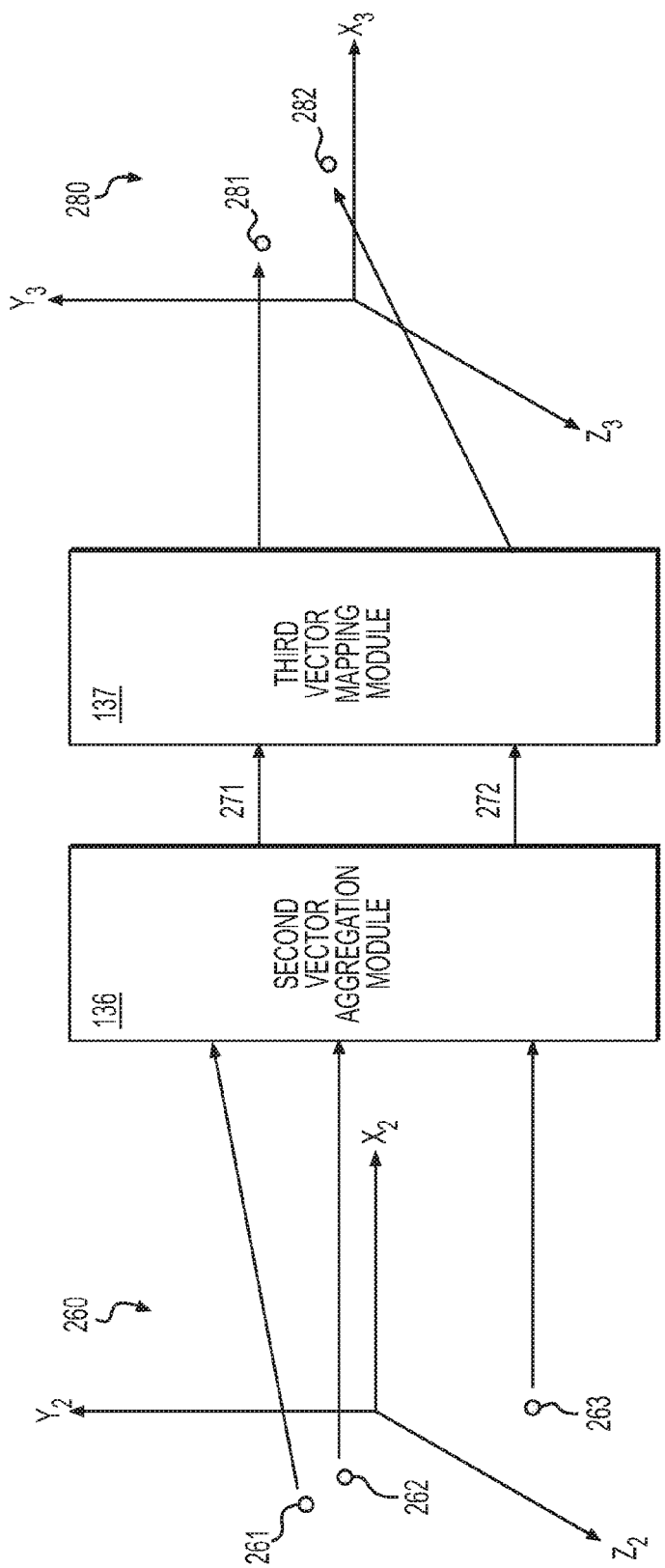
FIG. 13 is a diagram representing determination of third configuration input vectors based on second configuration output vectors and mapping of third configuration input vectors to third configuration output vectors in a third multidimensional space using a third vector-mapping module being configured.
Figure 14:
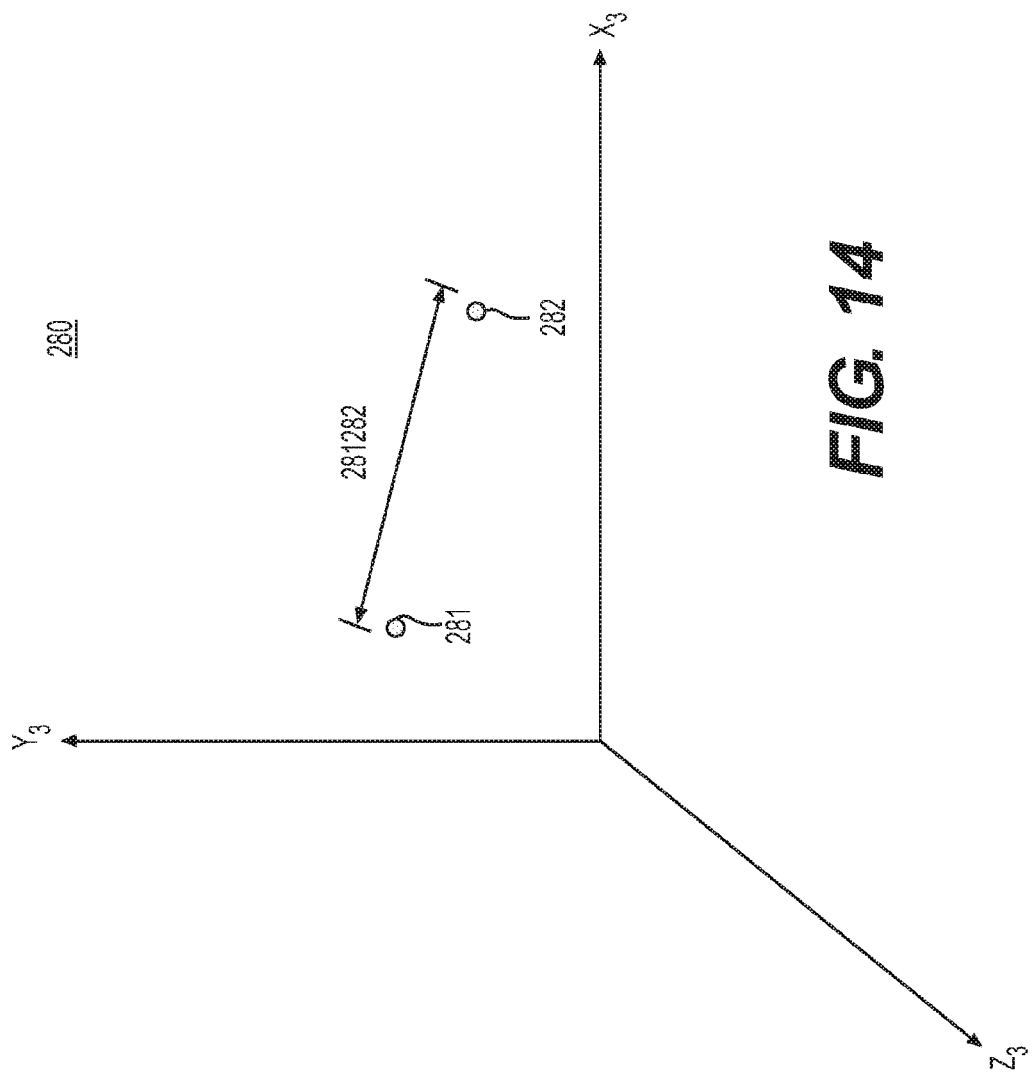
FIG. 14 is a diagram of a third multidimensional space including third configuration output vectors.

In some implementations, the aggregation of output vectors in one multidimensional space to generate input vectors and mapping of those generated input vectors to another multidimensional space may be repeated one or more additional times. FIG. 13 shows such a further extension of the present technology, with the second output vectors 261 to 263 being aggregated by a second vector-aggregation module 136 of the server 130 into third input vectors 271 and 272, the third input vector 271 being based on those of the second output vectors 261 to 263 which resulted from user events having occurred in the month of July (i.e. second output vectors 261 and 262) and the third input vector 272 being based on those of the second output vectors 261 to 263 which resulted from user events having occurred in the month of August (i.e. second output vector 263).

Again, aggregation may comprise concatenating selected ones of the second output vectors 261 to 263 and/or taking the average of the selected ones of the second output vectors 261 to 263 and compilation of statistics related to the types of user events from which the second output vectors 261 to 263 are derived. A third vector-mapping module 137 of the server 130 is then configured to map the third input vectors 271 and 272 to third output vectors 281 and 282 in a third multidimensional space 280, again such that the distance 281282 separating the third output vectors 281 and 282 (shown in FIG. 14) correlates to the time interval between the input vectors 271 and 272.

Once configuration of the first vector-mapping module 133 and the second-vector mapping module 135 (as well as the third-vector mapping module 137 and any further vector-mapping modules in implementations which include them) is complete, the configured vector-mapping modules may then be applied in an application phase to map input vectors corresponding to other user events to output vectors in the first, second, and other multidimensional spaces, as the case may be. In some implementations, the server 130 may itself employ the configured vector-mapping modules 133, 135, 137 in this application phase.

Figure 15:
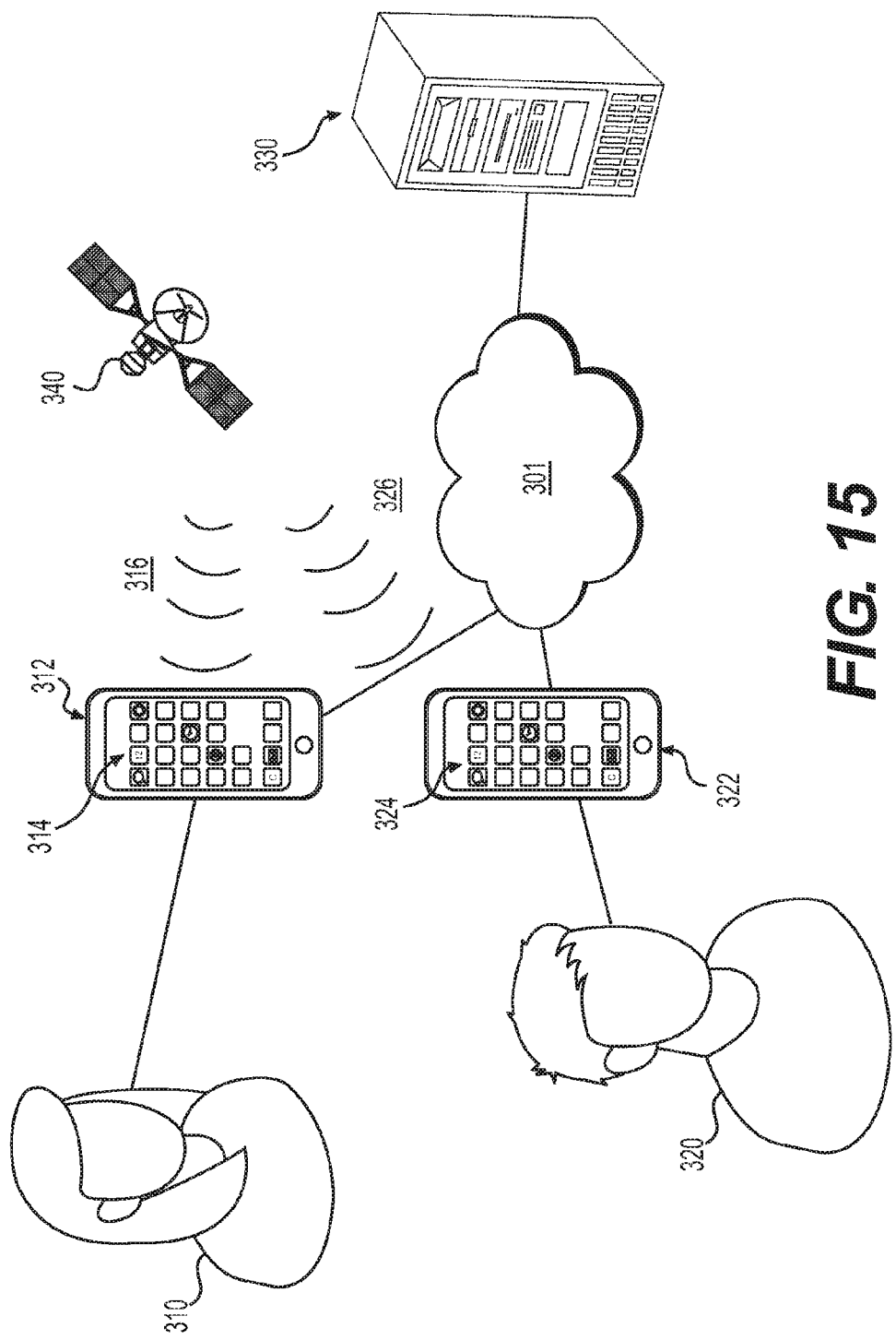
FIG. 15 is a diagram of a networked computing environment suitable for use of an exemplary implementation of the present technology.

In other implementations, a configuration of the vector-mapping modules 133, 135, 137 may be stored in a non-transitory computer-readable memory of the server 130 and/or transmitted to another one or more computers (physical or virtual) in communication with the server 130 (e.g. via a communications network such as the Internet), such as the server 330 in the networked computing environment 300 of FIG. 15. The server 330 may then configure its own first vector-mapping module 333 and second vector-mapping module 335 (shown in FIG. 18) based on the configuration information received from the server 130. As further shown in FIG. 15, the server 330 is in communication, via a communications network 301 (e.g. the Internet), with a smartphone 312 (e.g. an Apple iPhone™ or a Samsung Galaxy S4™) with a touchscreen 314 for displaying information to a user 310 and receiving touchscreen commands from the user 310, and a smartphone 322 with a touchscreen 324 for displaying information to a user 320 and receiving touchscreen commands from the user 320.

The users 310 may be the same as the users 110, 120 associated with the configuration phase, or they may be different users than the users 110, 120. Likewise, the smartphones 312, 322 may be the same devices as the smartphones 112, 122 or they may be different devices. A GPS satellite 340 transmits GPS signals 316, 326 to the smartphones 312, 322. The GPS satellite 340 may be the same as the GPS satellite 140 of the configuration phase, or it may be a different GPS satellite.

Though not depicted, it will be clear to those of skill in the art that smartphones 312 and 322 each comprise various hardware modules, including, along with their respective touchscreens 314 and 324, one or more single or multi-core processors, a random access memory, one or more network interfaces for communicating with the server 330 via the communications network 301, and a GPS receiver. It will also be understood that other implementations of the present technology may employ a geographical positioning technology other than GPS. Smartphones 312 and 322 are each running an operating system (e.g. Apple iOS, Google Android) which includes an intelligent personal assistant service (e.g. Apple Siri, Google Now). While server 330 is depicted as a single physical computer (which by implication comprises hardware modules including one or more processors, memory, and a network interface), it will also be understood that server 330 may be implemented using a plurality of networked computers, or as one or more virtual servers running on one or more physical computers (e.g. in the cloud).

Figure 16:
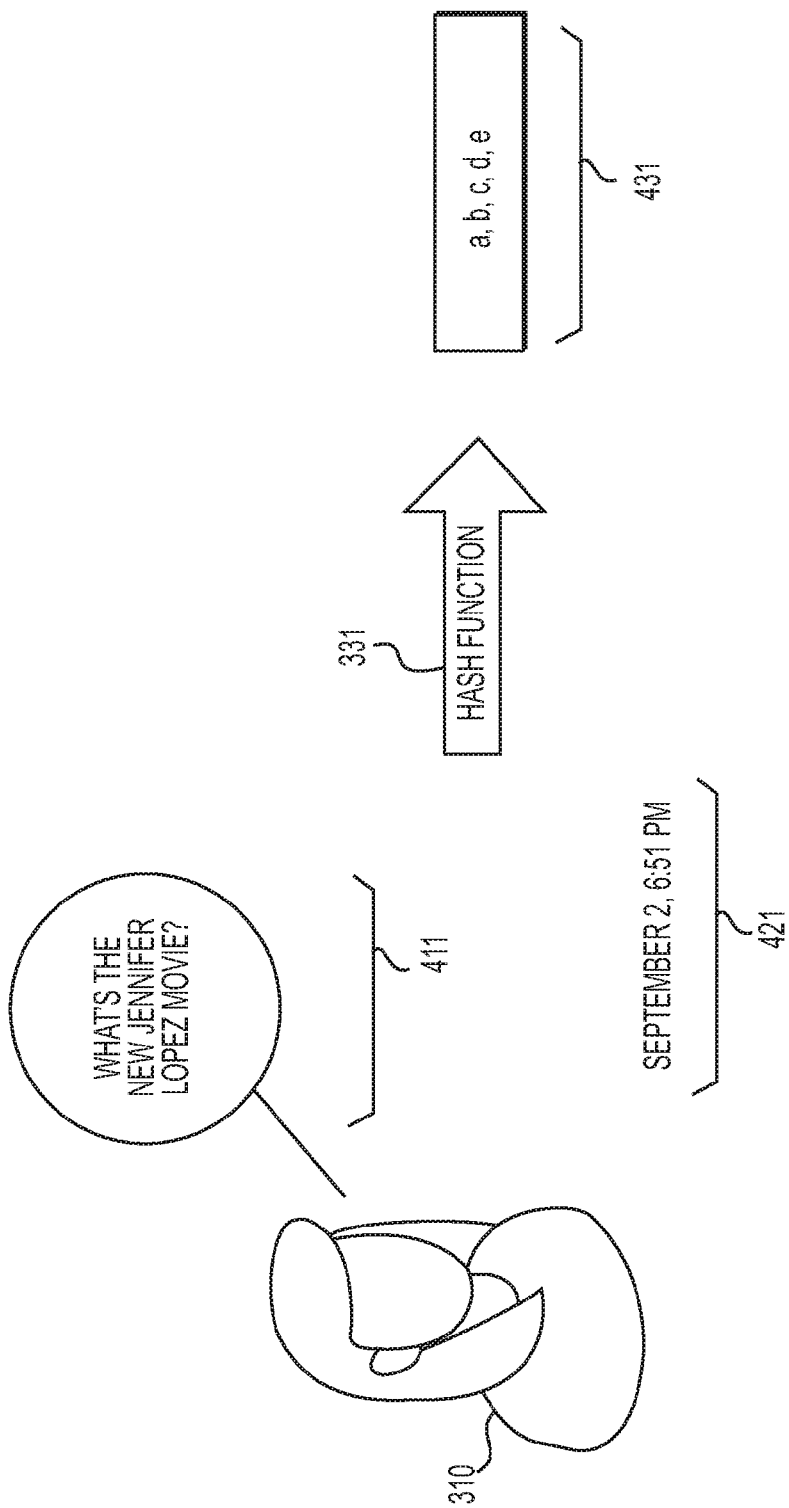
FIGS. 16 and 17 are diagrams representing determination of first input vectors corresponding to user events associated with a user.

Turning now to FIG. 16, a user event 411 associated with user 310 is shown. More specifically, at time 421 (6:51 pm on September 2), user 310 asks the question "What's the new Jennifer Lopez movie?" to the intelligent personal assistant running on his smartphone 312. A first hash function 331 is executed by the server 330 to determine an input vector 431 corresponding to the user event 411.

Figure 17:
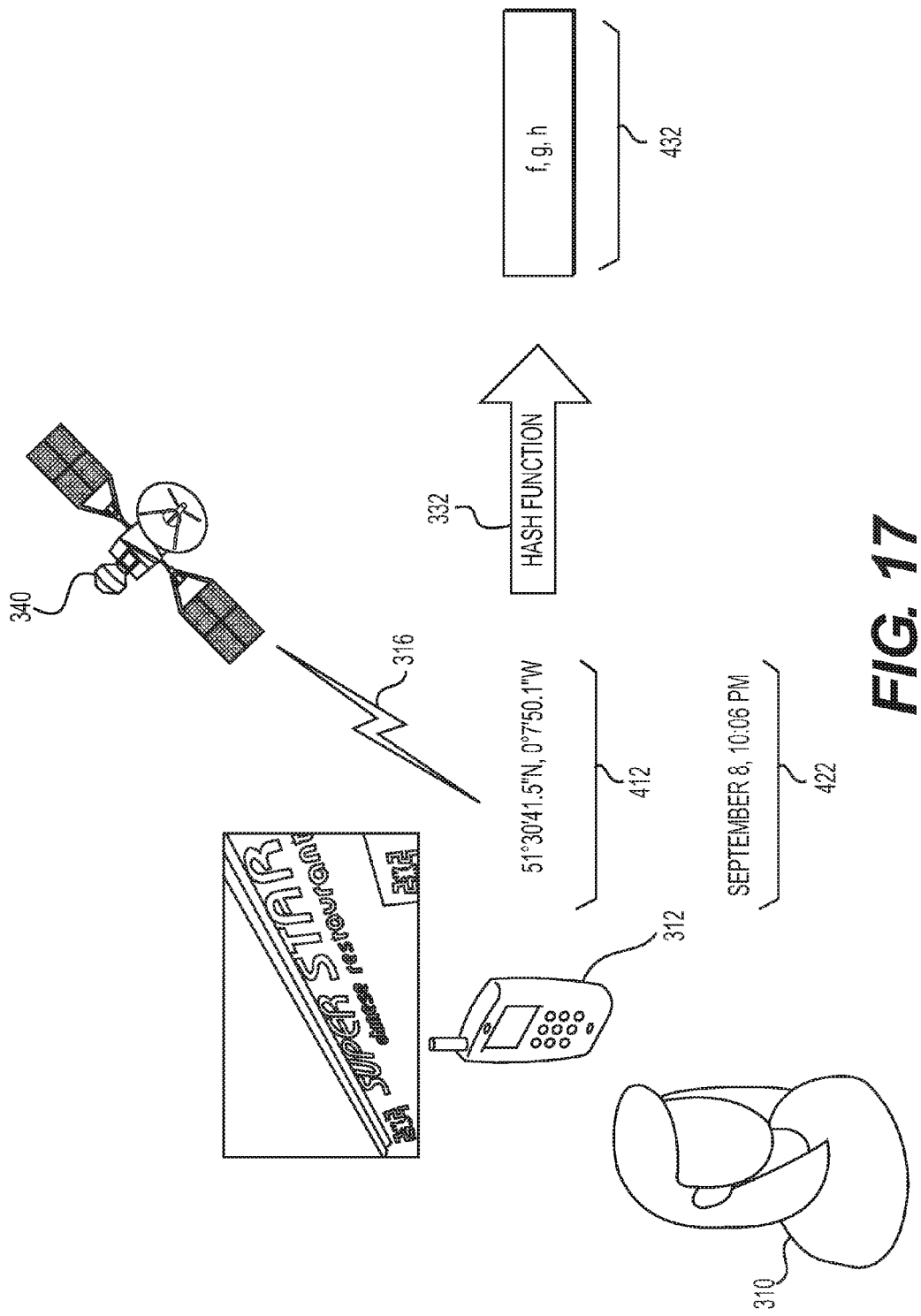

In FIG. 17, another user event 412 associate with the user 310 is shown. More specifically, at time 422 (10:06 pm on September 8), the smartphone 312 of user 310 is located at the Super Star Chinese restaurant, geographical coordinates of which are obtained according to the GPS signal 316 of GPS satellite 340 and transmitted to the server 330. The server 330 then executes a second hash function 332 to determine an input vector 432 corresponding to the user event 412.

Figure 18:
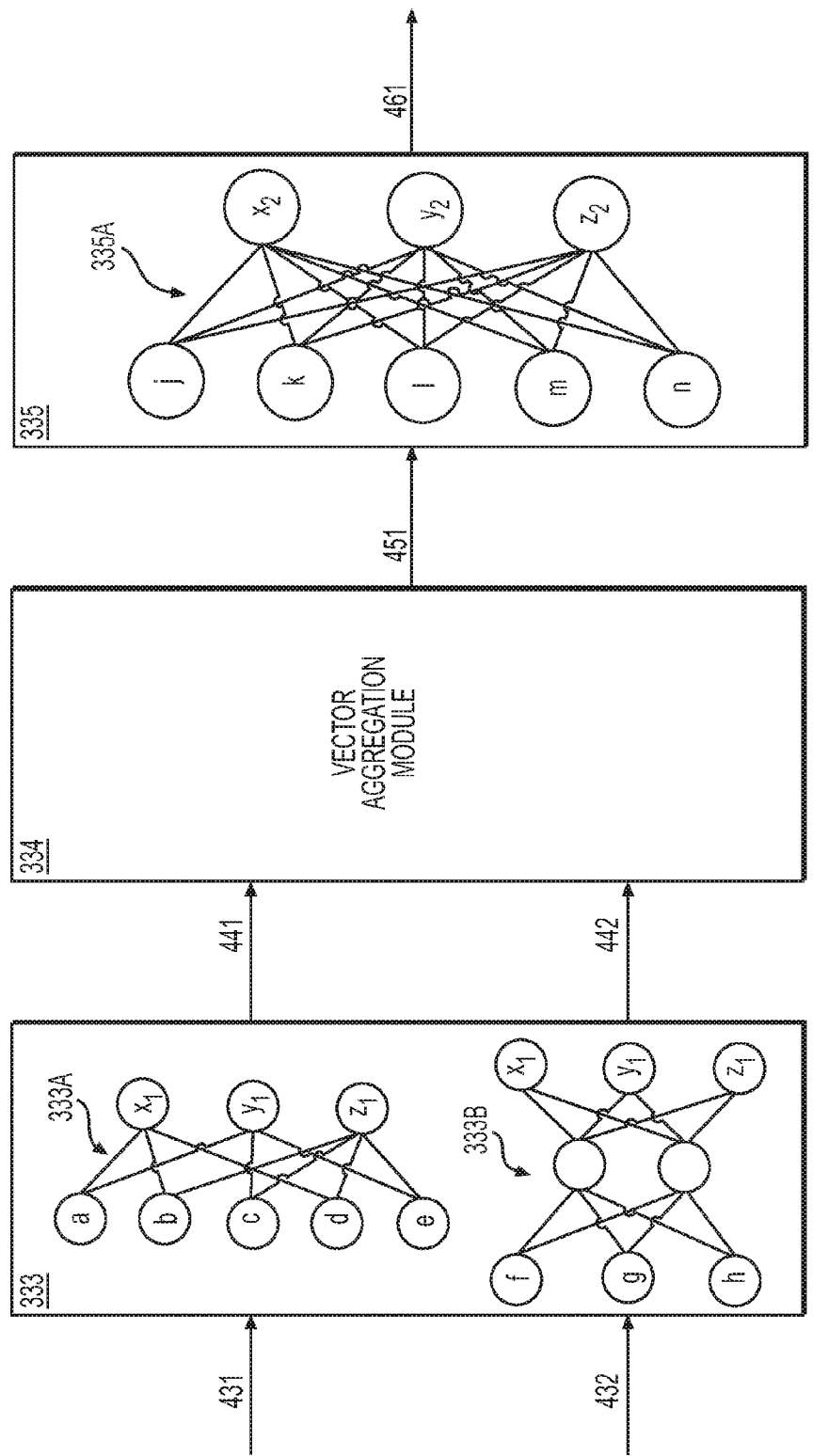
FIG. 18 is a diagram representing mapping of first input vectors to first output vectors in a first multidimensional space using a first vector-mapping module having been configured, determination of a second input vector based on first output vectors, and mapping of a second input vector to a second output vector in a second multidimensional space using a second vector-mapping module having been configured.

FIG. 18 depicts the conceptual process, performed by the server 330, of mapping the input vectors 431 and 432 to respective output vectors 441 and 442 in a first multidimensional space 440 (not explicitly depicted) using a first neural network 333A and a second neural network 333B of the first vector-mapping module 333 of the server 330; then aggregating the output vectors 441 and 442 to generate an input vector 451 using a vector-aggregation module 334 of the server 330 (in like manner to the aggregation of vectors described hereinabove during the configuration phase); and finally mapping the input vector 451 to an output vector 461 of a second multidimensional space 460 (depicted in FIG. 24) using a third neural network 335A of a second vector-mapping module 335 of the server 330. The output vector 461 thus generated therefore represents the behaviour of user 310, including submission of a Jennifer Lopez-related query and presence at Super Star Chinese restaurant.

Figure 19:
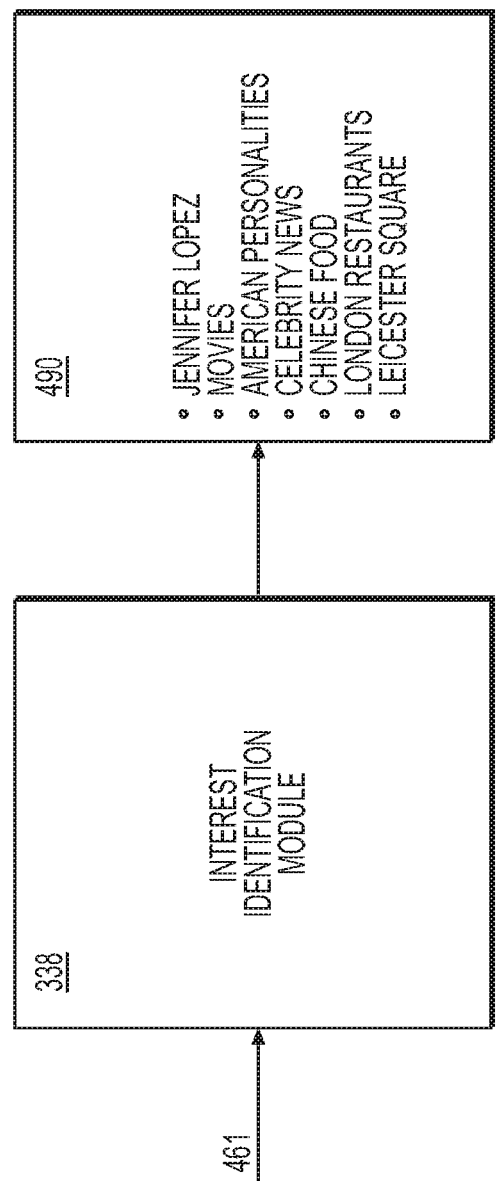
FIG. 19 is a diagram representing identification of user interests based on an output vector in the second multidimensional space.

In FIG. 19, the output vector 461 is analyzed by an interest identification module 338 of the server 330. The interest identification module 338 may include functions having been learned (using various machine learning techniques known in the art) to identify interests of a user such as user 310 based on an analysis of one or more output vectors in the first multidimensional space 440 and/or the second multidimensional space 460, those output vectors having been mapped from input vectors corresponding to user events by the vector-mapping modules 333, 335 of the server 330. As shown in FIG. 19, the result of the analysis performed by the interest identification module 338 may be a listing of estimated interests 490 of the user 310.

In FIG. 20, user 310 navigates to a webpage 500 of the BBC news. As part of serving the webpage 500, the BBC web server rendering the webpage 500 may obtain an identifier of the user 310 and communicate it to the server 330. The server 330 may then provide to the BBC web server the listing of estimated interests 490 of the user 310. Based on the estimated interests 490 of the user 310, the BBC web server may select news stories 511, 512, and 513 as the three most relevant news stories for user 310. The BBC web server may further determine that hyperlinks to the news stories should be presented in the order shown in FIG. 20, with the hyperlink to news story 511 appearing before the hyperlink to news story 512, and the hyperlink to news story 512 appearing before the hyperlink to news story 513. The past behaviour of user 310 as represented by the output vector 461 and interpreted by the interest identification module 338 has thus influenced the content and ordering of the BBC news webpage 500. As shown in FIG. 20, the user 310 ultimately selects the hyperlink to news story 513.

Figure 21:
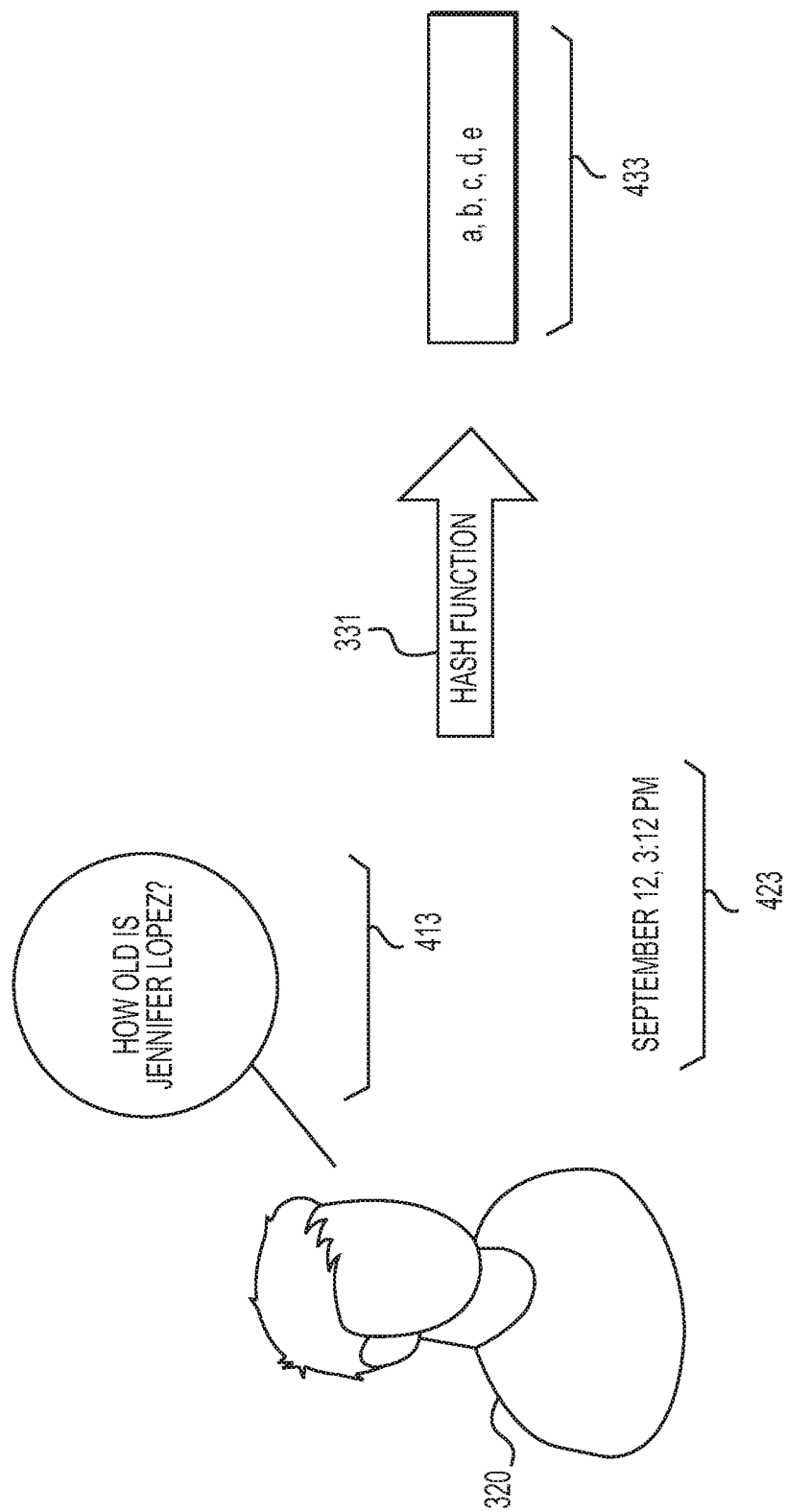
FIGS. 21 and 22 are diagrams representing determination of first input vectors corresponding to user events associated with a user.

FIG. 21 shows a user event 413 associated with a user 320 other than the user 310, wherein the user 320 asks the question "How old is Jennifer Lopez?" to the intelligent personal assistant running on his smartphone 322 at time 423 (3:12 pm on September 7). The first hash function 331 is executed by the server 330 in order to determine the input vector 433 corresponding to the user event 413.

Figure 22:
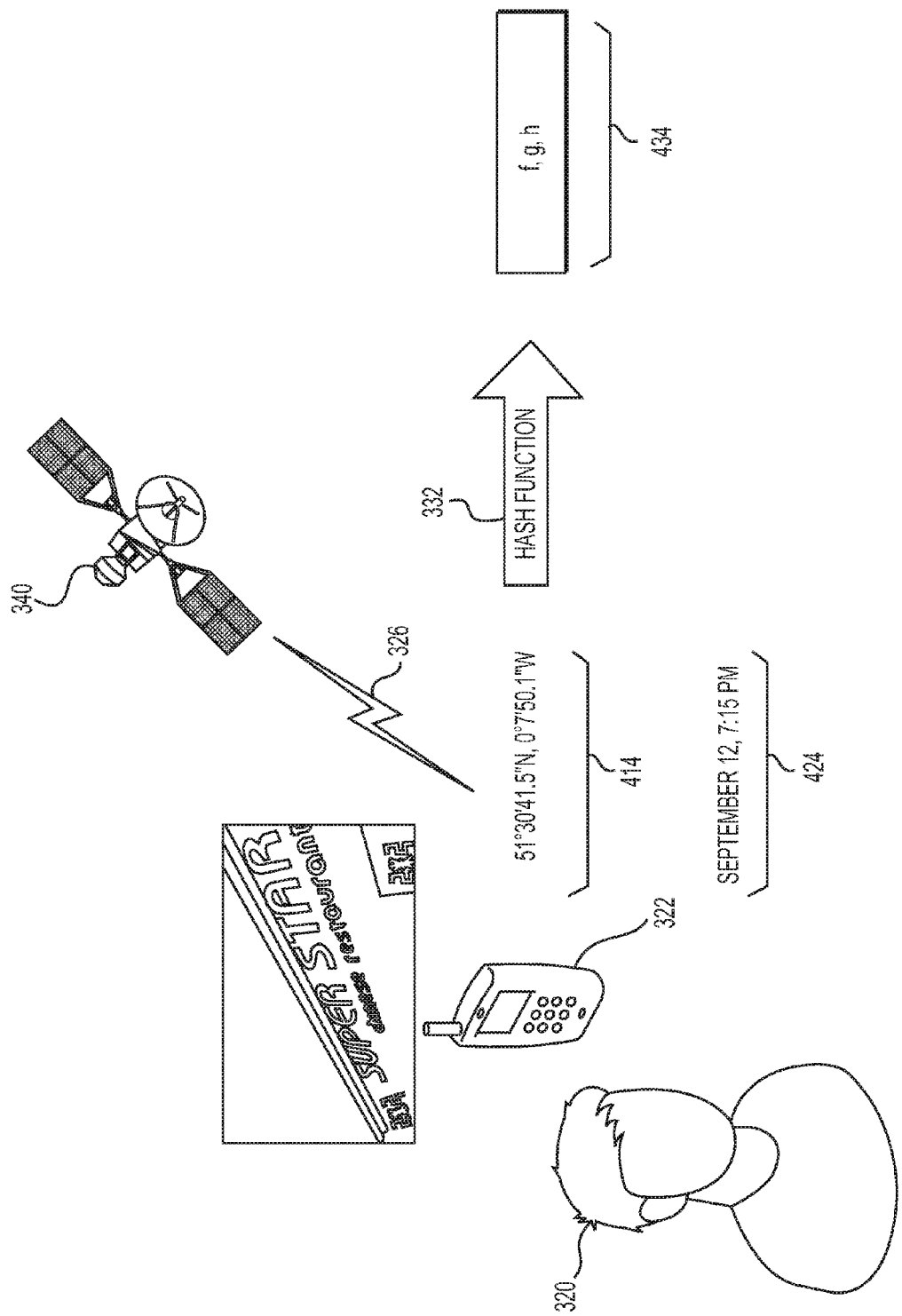

FIG. 22 shows another user event 414 associated with the user 320, wherein the smartphone 322 of user 320 is located at the Super Star Chinese restaurant at time 424 (7:15 pm on September 12) according to the GPS signal 326 received from GPS satellite 340. The server 330 then executes the second hash function 332 to determine an input vector 434 corresponding to the user event 414.

Figure 23:
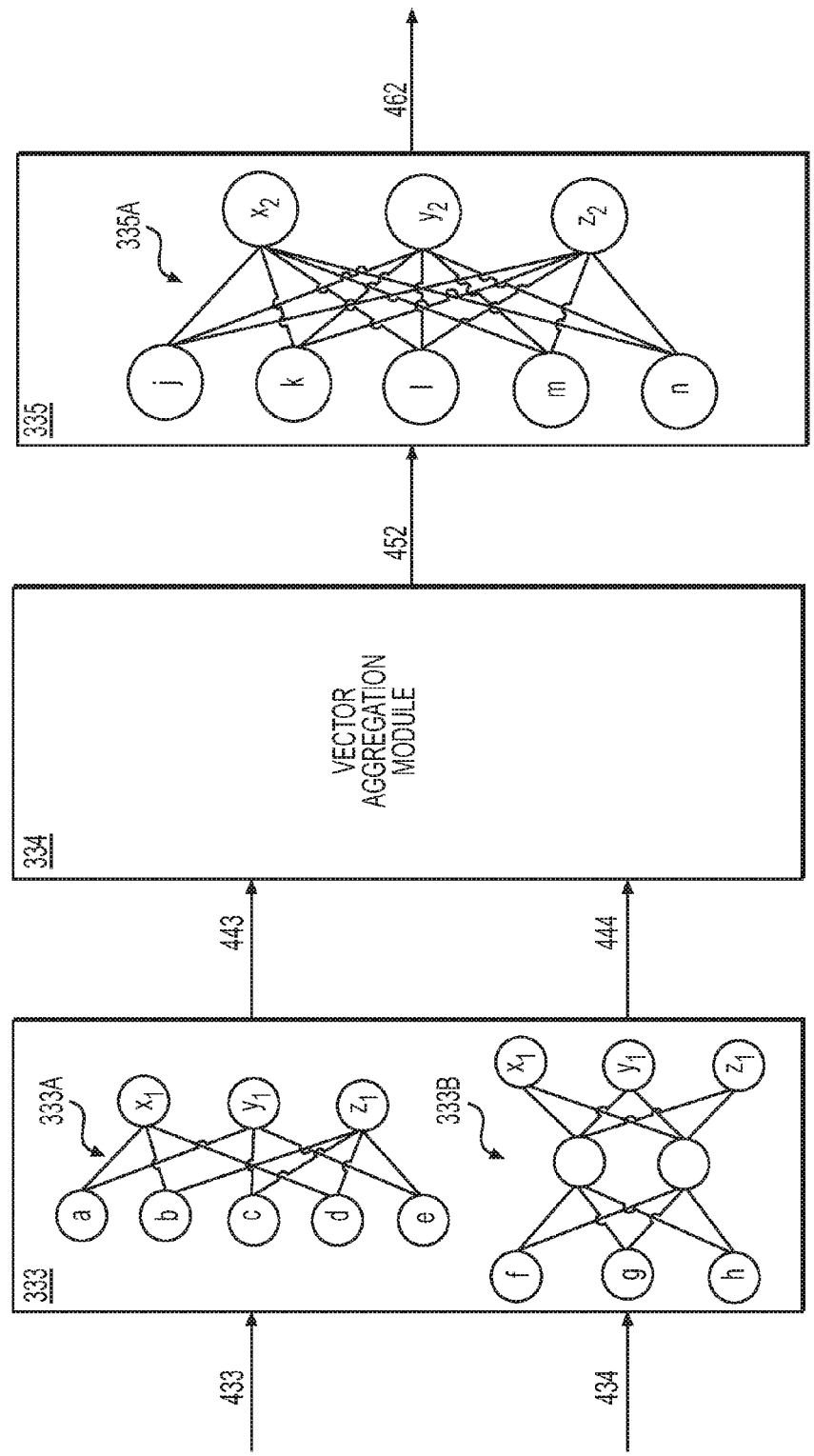
FIG. 23 is a diagram representing mapping of first input vectors to first output vectors in a first multidimensional space using a first vector-mapping module having been configured, determination of a second input vector based on first output vectors, and mapping of a second input vector to a second output vector in a second multidimensional space using a second vector-mapping module having been configured.

FIG. 23 depicts the conceptual process, performed by the server 330, of mapping the input vectors 433 and 434 to respective output vectors 443 and 444 in a first multidimensional space 440 (not explicitly depicted) using the first neural network 333A and the second neural network 333B of the first vector-mapping module 333; then aggregating the output vectors 443 and 444 to generate an input vector 452 using a vector-aggregation module 334; and finally mapping the input vector 452 to an output vector 462 of a second multidimensional space 460 (depicted in FIG. 24) using a third neural network 335A of the second vector-mapping module 335. The output vector 462 thus generated therefore represents the behaviour of user 320, including submission of a Jennifer Lopez-related query and presence at Super Star Chinese restaurant.

Figure 24:
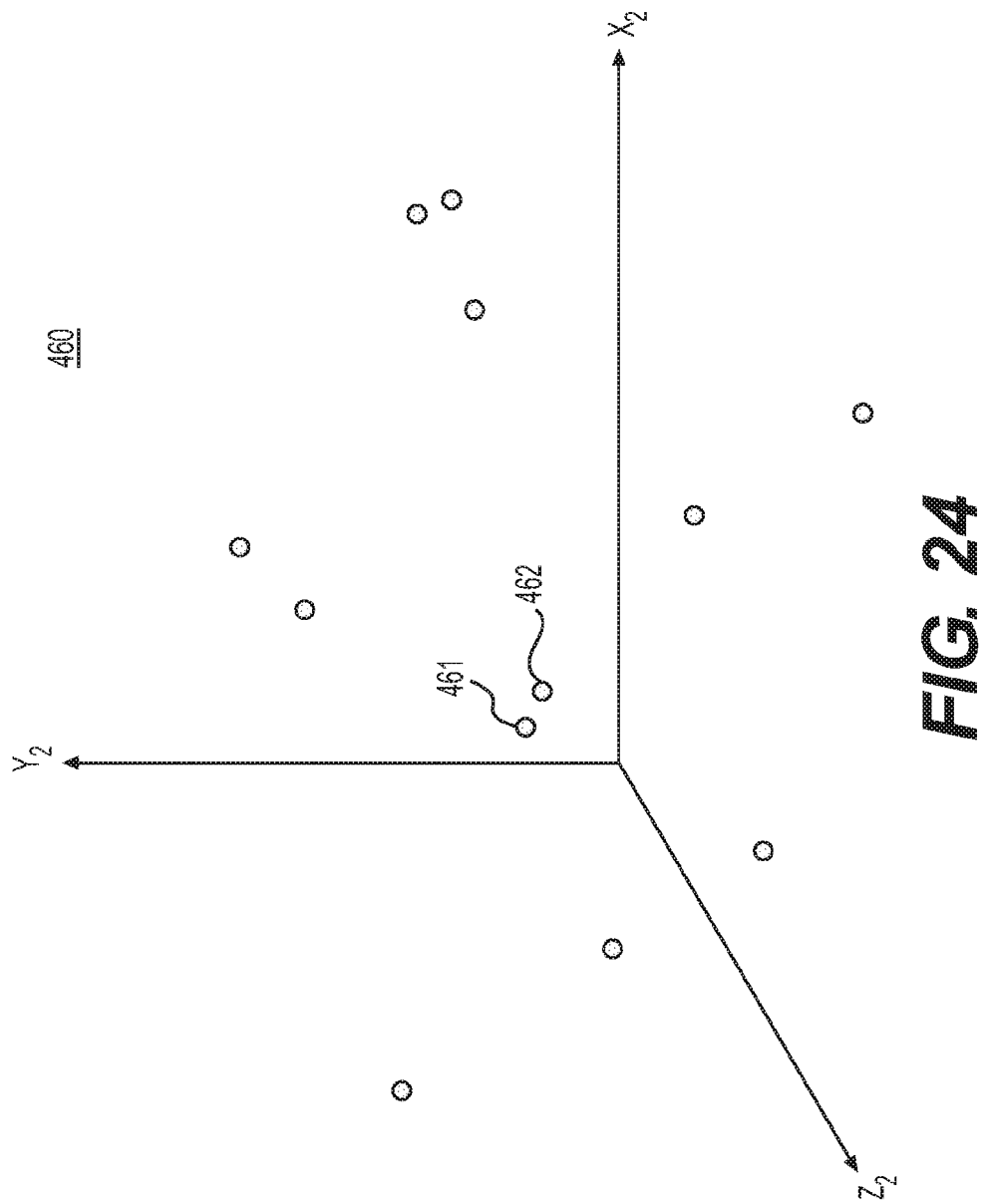
FIG. 24 is a diagram of a second multidimensional space including the second output vectors having been mapped with reference to FIGS. 18 and 23.
Figure 25:
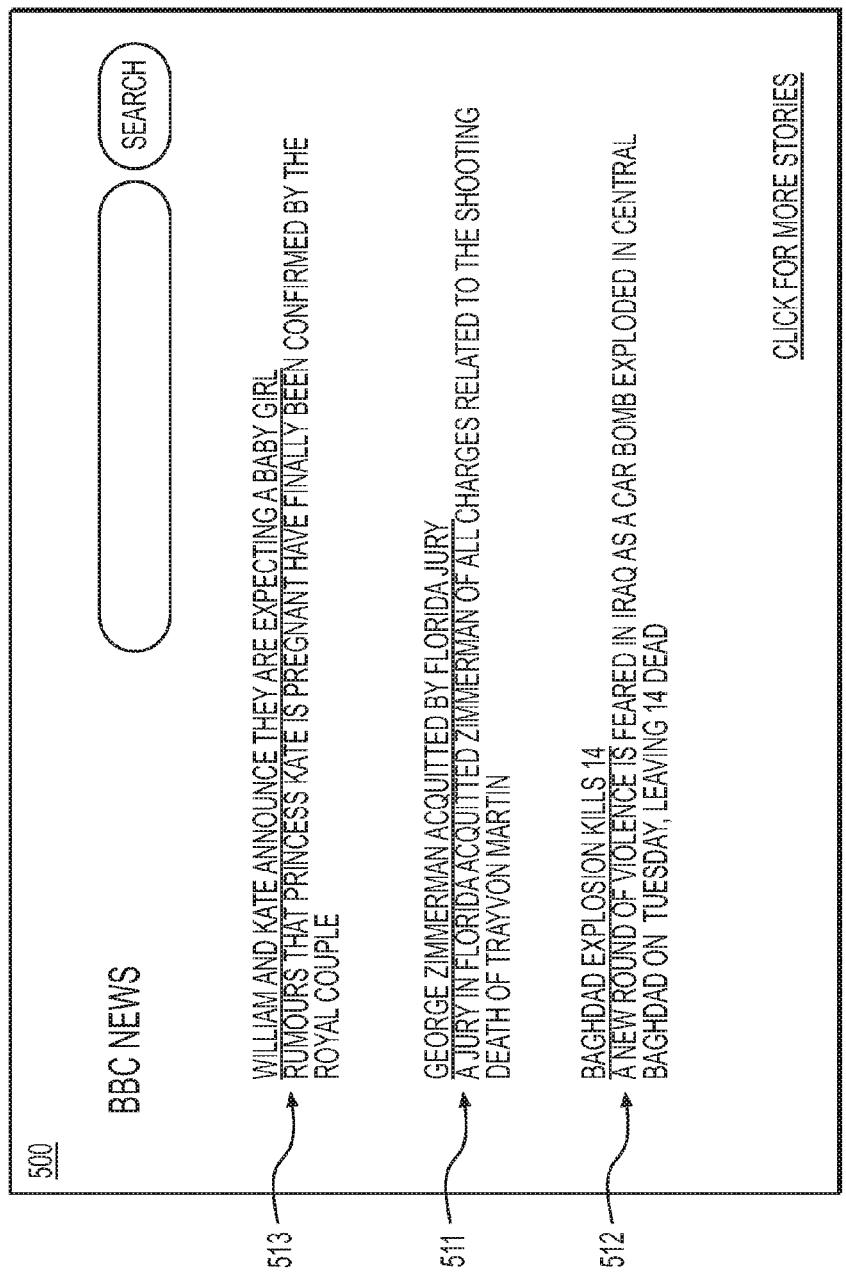
FIG. 25 is an exemplary screenshot of a web browser displaying hyperlinks to news stories in a modified order relative to that shown in FIG. 20.

Because the behaviours of user 310 and the user 320 are similar—both asked questions related to Jennifer Lopez, and both were located at the Super Star Chinese restaurant, it is the resulting output vectors 461 and 462 generated by the vector-mapping modules 333 and 335 may be located near to one another in the second multidimensional space 460, for example as shown in FIG. 24. Also shown in the second multidimensional space 460 are several other output vectors which may have been mapped to the second multidimensional space 460, but which are not based on user events very similar to the user events 411 to 414 having resulted in the output vectors 461 and 462, and are therefore not located near the output vectors 461 and 462 in the second multidimensional space 460.

Because the output vector 461 representative of the user behaviour of user 310 is near the output vector 462 representative of the user behaviour of user 320, the server 330 may associate the user 320 to the user 310. This association of user 320 to user 310 may then be exploited to target a message to user 320 which is known to appeal to user 310. For example, given that user 310 selected the hyperlink to news story 513 when presented with hyperlinks to various news stories 511 to 513, when user 320 later visits the webpage 500 of the BBC news, the link to news story 513 may be presented ahead of the links to news stories 511 and 512. In this manner, the similarity of the output vectors representative of the respective user behaviours of user 310 and user 320 may result in an association of those users, such that a known interest of one user may be imputed as an estimated interest of the other user. Moreover, in other implementations (not depicted), a user may be associated not with a single other user, but with a group of users, and a known interest of that group of users (e.g. a demographic group, such as professionals aged 25-34) may be imputed to the user so as to determine a message to be provided to him or her.

Figure 26:
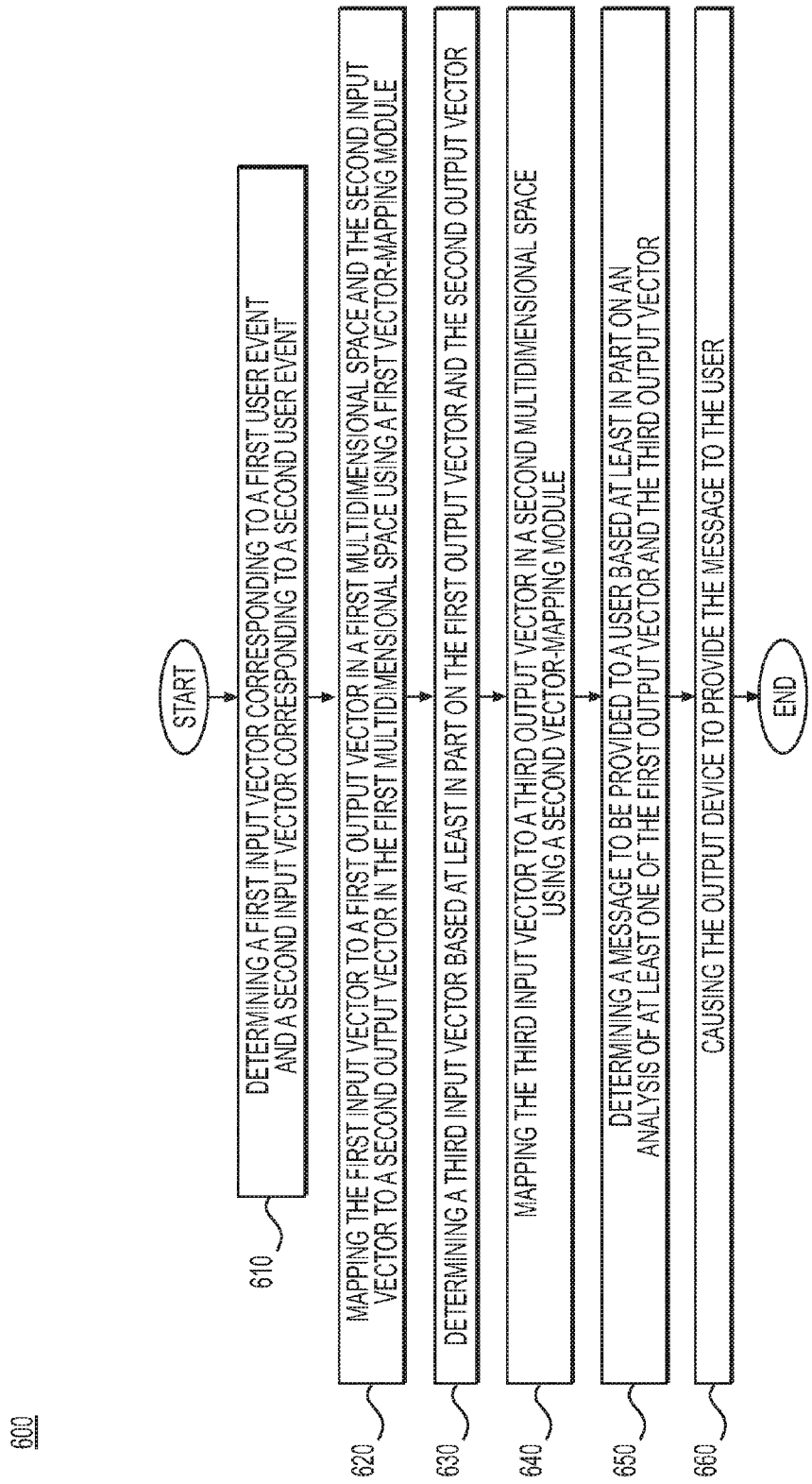
FIG. 26 is a flowchart illustrating the steps of a method implementation of the present technology.

FIG. 26 is a flowchart of a method implementation 600 of the present technology, as may be executed by the server 330 of FIG. 15 (as described above) or by any other suitable computing device able to collect information about user events associated with one or more users. At step 610, a first input vector (e.g. input vector 431) corresponding to a first user event (e.g. user event 411) and a second input vector (e.g. input vector 432) corresponding to a second user event (e.g. user event 412) are determined. At step 620, the first input vector 431 is mapped to a first output vector 441 in a first multidimensional space 440 and the second input vector 432 is mapped to a second output vector 442 in the first multidimensional space 440 using a first vector-mapping module 333 having been configured to map first input vectors (e.g. 231 to 236) to first output vectors (e.g. 241 to 246) in the first multidimensional space such that a respective distance separating each one of the first output vectors from each other one of the first output vectors is correlated to a time interval between a time associated with a respective one of the first input vectors having been mapped to the one of the first output vectors and a time associated with a respective other one of the first input vectors having been mapped to the other one of the first output vectors. At step 630, a third input vector (e.g. input vector 451) is determined based at least in part on the first output vector 441 and the second output vector 442. At step 640, the third input vector 451 is mapped to a third output vector 4671 in a second multidimensional space 460 using a second vector-mapping module 335 having been configured to map second input vectors (e.g. 251 to 253) to second output vectors (261 to 263) in the second multidimensional space such that a respective distance separating each one of the second output vectors from each other one of the second output vectors is correlated to a time interval between a time associated with a respective one of the second input vectors having been mapped to the one of the second output vectors and a time associated with a respective other one of the second input vectors having been mapped to the other one of the second output vectors. At step 650, a message to be provided to a user is determined based at least in part on an analysis of at least one of the first output vector and the third output vector. At step 660, the output device (e.g. a display showing the webpage 500 of the BBC news) is made to provide the message (the webpage content including a ranking of hyperlinks to news stories) to the user.

It should be noted that the hashing operation(s) described herein is meant to illustrate one type of transformation. However, it should not be construed to mean as the only possible implementation of such transformation. One skilled in the art should appreciate that other types of data transformation can be used in alternative embodiments of the present technology. Other non-limiting examples of other such possible transformation functions can include, but are not limited to: format change (specifically applicable to the geo-information, time, and the like), transformation of only a portion of data and the like. Furthermore, it should be understood that the hashing function itself is not limited to any particular implementation thereof. As such, various embodiments of the present technology, can involve a hashing function based on division, hashing of various length strings, multiplication based hashing, perfect hashing, universal hashing and the like.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for estimating user interests, the method executable by a computing device in communication with an output device, the method comprising:

determining, by the computing device, a first input vector corresponding to a first user event and a second input vector corresponding to a separate second user event;

configuring a first vector-mapping module to map given input vectors to output vectors in a first multidimensional space such that a respective distance separating the output vectors from each other is correlated to a difference between a user event context associated with the first input vector having been mapped to its output vector and a user event context associated with the second input vector having been mapped to its output vector, the configuring the first vector-mapping module including configuring a first neural network and a second neural network by:

connecting the first neural network and the second neural network in a coupled Siamese neural network arrangement, and training the first and second neural networks to minimize a cross-modal loss between the first neural network and the second neural network;

mapping, using the first vector-mapping module of the computing device, the first input vector to a first output vector in the first multidimensional space and the separate second input vector to a second output vector in the first multidimensional space, the first vector-mapping module being enabled to map both the first output vector and the second output vector to the first multidimensional space even if the first user event and the second user event are of different types;

determining, by the computing device, a third input vector based at least in part on the first output vector and the separate second output vector;

configuring a second vector-mapping module to map input vectors to output vectors in a second multidimensional space such that a respective distance separating the output vectors from each other is correlated to a difference between a user event context associated with one input vector, the one input vector being a respective output vector of the first vector-mapping module and a user event context associated with another input, the other input vector being another respective output vector of the first vector-mapping module, the configuring the second vector-mapping module including configuring a third neural network;

mapping, using the second vector-mapping module of the computing device, the third input vector to a third output vector in the second multidimensional space;

determining, by the computing device, a message to be provided to a user based at least in part on an analysis of at least one of the first output vector and the third output vector; and causing, by the computing device, the output device to provide the message to the user.

2. The method of claim 1, wherein:

the first vector-mapping module has been configured to map first configuration input vectors to first configuration output vectors in the first multidimensional space such that a respective distance separating each one of the first configuration output vectors from each other one of the first configuration output vectors is correlated to a difference between a context associated with a respective one of the first configuration input vectors having been mapped to the one of the first configuration output vectors and a context associated with a respective other one of the first configuration input vectors having been mapped to the other one of the first configuration output vectors; and the second vector-mapping module has been configured to map second configuration input vectors to second configuration output vectors in the second multidimensional space such that a respective distance separating each one of the second configuration output vectors from each other one of the second configuration output vectors is correlated to a difference between a context associated with a respective one of the second configuration input vectors having been mapped to the one of the second configuration output vectors and a context associated with a respective other one of the second configuration input vectors having been mapped to the other one of the second configuration output vectors.

3. The method of claim 2, wherein:

the difference between the context associated with the respective one of the first configuration input vectors having been mapped to the one of the first configuration output vectors and the context associated with the respective other one of the first configuration input vectors having been mapped to the other one of the first configuration output vectors comprises a time interval between a time associated with the respective one of the first configuration input vectors having been mapped to the one of the first configuration output vectors and a time associated with the respective other one of the first configuration input vectors having been mapped to the other one of the first configuration output vectors; and the difference between the context associated with the respective one of the second configuration input vectors having been mapped to the one of the second configuration output vectors and the context associated with the respective other one of the second configuration input vectors having been mapped to the other one of the second configuration output vectors comprises a time interval between a time associated with the respective one of the second configuration input vectors having been mapped to the one of the second configuration output vectors and a time associated with the respective other one of the second configuration input vectors having been mapped to the other one of the second configuration output vectors.

4. The method of claim 1, further comprising:

determining a fourth input vector based at least in part on the third output vector; and mapping the fourth input vector to a fourth output vector in a third multidimensional space using a third vector-mapping module.

5. The method of claim 4, wherein:

the first vector-mapping module has been configured to map first configuration input vectors to first configuration output vectors in the first multidimensional space such that a respective distance separating each one of the first configuration output vectors from each other one of the first configuration output vectors is correlated to a difference between a context associated with a respective one of the first configuration input vectors having been mapped to the one of the first configuration output vectors and a context associated with a respective other one of the first configuration input vectors having been mapped to the other one of the first configuration output vectors;

the second vector-mapping module has been configured to map second configuration input vectors to second configuration output vectors in the second multidimensional space such that a respective distance separating each one of the second configuration output vectors from each other one of the second configuration output vectors is correlated to a difference between a context associated with a respective one of the second configuration input vectors having been mapped to the one of the second configuration output vectors and a context associated with a respective other one of the second configuration input vectors having been mapped to the other one of the second configuration output vectors; and the third vector-mapping module has been configured to map third configuration input vectors to third configuration output vectors in the third multidimensional space such that a respective distance separating each one of the third configuration output vectors from each other one of the third configuration output vectors is correlated to a difference between a context associated with a respective one of the third configuration input vectors having been mapped to the one of the third configuration output vectors and a context associated with a respective other one of the third configuration input vectors having been mapped to the other one of the third configuration output vectors.

6. The method of claim 5, wherein:

the difference between the context associated with the respective one of the first configuration input vectors having been mapped to the one of the first configuration output vectors and the context associated with the respective other one of the first configuration input vectors having been mapped to the other one of the first configuration output vectors comprises a time interval between a time associated with the respective one of the first configuration input vectors having been mapped to the one of the first configuration output vectors and a time associated with the respective other one of the first configuration input vectors having been mapped to the other one of the first configuration output vectors;

the difference between the context associated with the respective one of the second configuration input vectors having been mapped to the one of the second configuration output vectors and the context associated with the respective other one of the second configuration input vectors having been mapped to the other one of the second configuration output vectors comprises a time interval between a time associated with the respective one of the second configuration input vectors having been mapped to the one of the second configuration output vectors and a time associated with the respective other one of the second configuration input vectors having been mapped to the other one of the second configuration output vectors; and the difference between the context associated with the respective one of the third configuration input vectors having been mapped to the one of the third configuration output vectors and the context associated with the respective other one of the third configuration input vectors having been mapped to the other one of the third configuration output vectors comprises a time interval between a time associated with the respective one of the third configuration input vectors having been mapped to the one of the third configuration output vectors and a time associated with the respective other one of the third configuration input vectors having been mapped to the other one of the third configuration output vectors.

7. The method of claim 4, wherein:
the third output vector represents a plurality of user events having occurred during a first period of time; and
the fourth output vector represents a plurality of user events having occurred during a second period of time, the second period of time being longer than the first period of time and including the first period of time.

8. The method of claim 1, wherein the first user event is of a first user event type and the second user event is of a second user event type other than the first user event type; and
wherein:
mapping the first input vector to the first output vector in the first multidimensional space using the first vector-mapping module comprises mapping the first input vector to the first output vector using a first neural network configured to map input vectors corresponding to user events of the first user event type to output vectors in the first multidimensional space;
mapping the second input vector to the second output vector in the first multidimensional space using the first vector-mapping module comprises mapping the second input vector to the second output vector using a second neural network configured to map input vectors corresponding to user events of the second user event type to output vectors in the first multidimensional space; and
mapping the third input vector to the third output vector in the second multidimensional space using the second vector-mapping module comprises mapping the third input vector to the third output vector in the second multidimensional space using a third neural network having been configured to map input vectors having been determined based on at least one vector in the first multidimensional space to output vectors in the second multidimensional space.

9. The method of claim 3, further comprising:
before mapping the first input vector to the first output vector using the first vector-mapping module, configuring the first vector-mapping module to map the first configuration input vectors to the first configuration output vectors in the first multidimensional space such that the respective distance separating each one of the first configuration output vectors from each other one of the first configuration output vectors is correlated to the time interval between the time associated with the respective one of the first configuration input vectors being mapped to the one of the first configuration output vectors and the time associated with the respective other one of the first configuration input vectors being mapped to the other one of the first configuration output vectors; and
before mapping the third input vector to the third output vector using the second vector-mapping module, configuring the second vector-mapping module to map the second configuration input vectors to the second configuration output vectors in the second multidimensional space such that the respective distance separating each one of the second configuration output vectors from each other one of the second configuration output vectors is correlated to the time interval between the time associated with the respective one of the second configuration input vectors being mapped to the one of the second configuration output vectors and the time associated with the respective other one of the second configuration input vectors being mapped to the other one of the second configuration output vectors.

10. The method of claim 1, wherein the first user event and the second user event are associated with the user.

11. The method of claim 1, wherein at least one of the first user event and the second user event is associated with a second user other than the user.

12. The method of claim 10, wherein the first configuration input vectors correspond to user events associated with the user.

13. The method of claim 11, wherein at least one of the first configuration input vectors corresponds to a user event associated with a second user other than the user.

14. The method of claim 1, further comprising receiving an indication of the first user event from a user input device in communication with the computing device.

15. The method of claim 14, further comprising receiving at least one of:
an indication of the second user event from the user input device; and
an indication of the second user event from a second user input device other than the user input device.

16. The method of claim 1, wherein the first user event comprises a use of a network resource.

17. The method of claim 16, wherein the network resource comprises a search engine and the use of the network resource comprises a submission of a search query.

18. The method of claim 17, wherein determining the first input vector corresponding to the first user event comprises determining the first input vector based at least in part on a search term of the search query.

19. The method of claim 1, wherein the second user event comprises an association of a user with a geographical location.

20. The method of claim 1, wherein:
determining the message to be provided to the user comprises estimating a network resource to be of interest to the user; and
causing the output device to provide the message to the user comprises causing the output device to provide an indication of the network resource to the user.

21. The method of claim 1, wherein determining the message to be provided to the user based on the analysis of the at least one of first output vector and the third output vector comprises:
feeding the at least one of the first output vector and the third output vector as an input to an interest identification module having been configured to identify user interests based on vectors in at least one of the first multidimensional space and the second multidimensional space; and
determining the message to be provided based on an interest of the user identified by the interest identification module.

22. The method of claim 1, wherein determining the message to be provided to the user based on the analysis of the at least one of first output vector and the third output vector comprises:
identifying a second user similar to the user based on the analysis;
identifying an interest of the second user; and
determining the message to be provided to the user based on the interest of the second user.

23. The method of claim 1, wherein determining the message to be provided to the user based on the analysis of the at least one of first output vector and the third output vector comprises:
associating the user with a group of users based on the analysis;

identifying an interest of the group of users; and
determining the message to be provided to the user based on the interest of the group of users.

24. The method of claim 1, wherein determining the third input vector based at least in part on the first output vector and the second output vector comprises calculating an average of vectors including the first output vector and the second output vector.

25. A non-transitory computer-readable medium storing program instructions for estimating user interests, the program instructions being executable by a computing device in communication with an output device to effect:
 determination, by the computing device, of a first input vector corresponding to a first user event and a second input vector corresponding to a separate second user event;
 configuring a first vector-mapping module to map given input vectors to output vectors in a first multidimensional space such that a respective distance separating the output vectors from each other is correlated to a difference between a user event context associated with the first input vector having been mapped to its output vector and a user event context associated with the second input vector having been mapped to its output vector, the configuring the first vector-mapping module including configuring a first neural network and a second neural network by:
  connecting the first neural network and the second neural network in a coupled Siamese neural network arrangement, and
  training the first and second neural networks to minimize a cross-modal loss between the first neural network and the second neural network;
 mapping, using a first vector-mapping module of the computing device, of the first input vector to a first output vector in a first multidimensional space and the separate second input vector to a second output vector in the first multidimensional space,
 the first vector-mapping module being enabled to map both the first output vector and the second output vector to the first multidimensional space even if the first user event and the second user event are of different types;
 determination, by the computing device, of a third input vector based at least in part on the first output vector and the separate second output vector;
 configuring a second vector-mapping module to map input vectors to output vectors in a second multidimensional space such that a respective distance separating the output vectors from each other is correlated to a difference between a user event context associated with one input vector, the one input vector being a respective output vector of the first vector-mapping module and a user event context associated with another input, the other input vector being another respective output vector of the first vector-mapping module, the configuring the second vector-mapping module including configuring a third neural network;
 mapping, using the second vector-mapping module of the computing device, of the third input vector to a third output vector in the second multidimensional space;
 determination, by the computing device, of a message to be provided to a user based at least in part on an analysis of at least one of the first output vector and the third output vector; and
 causing, by the computing device, the output device to provide the message to the user.

\* \* \* \* \*